US008534253B2

(12) United States Patent
Matsubara

(10) Patent No.: US 8,534,253 B2
(45) Date of Patent: Sep. 17, 2013

(54) REMOTE STARTING DEVICE AND REMOTE STARTING METHOD

(75) Inventor: Manabu Matsubara, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 351 days.

(21) Appl. No.: 13/020,185

(22) Filed: Feb. 3, 2011

(65) Prior Publication Data
US 2011/0197844 A1   Aug. 18, 2011

(30) Foreign Application Priority Data

Feb. 12, 2010 (JP) .................................. 2010-029429
Oct. 7, 2010 (JP) .................................. 2010-227615

(51) Int. Cl.
*F02N 11/08* (2006.01)
*F02D 41/06* (2006.01)

(52) U.S. Cl.
USPC ........................................ 123/179.2; 701/113

(58) Field of Classification Search
USPC ...... 123/179.2, 179.3, 179.4, 179.5; 701/113
See application file for complete search history.

(56) References Cited

U.S. PATENT DOCUMENTS

| 7,349,798 | B2* | 3/2008 | Beyene ........................... 701/115 |
| 7,474,943 | B2* | 1/2009 | Matsubara et al. ................ 701/2 |
| 7,514,811 | B2* | 4/2009 | Matsubara et al. ........... 307/10.5 |
| 7,634,333 | B2* | 12/2009 | Matsubara et al. ................ 701/2 |
| 2003/0150416 | A1* | 8/2003 | Flick ........................... 123/179.2 |
| 2004/0168663 | A1* | 9/2004 | Matsuura et al. ........... 123/179.2 |
| 2007/0200667 | A1* | 8/2007 | Matsubara et al. ........... 340/5.64 |

FOREIGN PATENT DOCUMENTS

| JP | A 2007-269274 | 10/2007 |
| JP | A 2009-67154 | 4/2009 |
| JP | A 2009-255836 | 11/2009 |
| JP | 2012-82716 | * 4/2012 |

* cited by examiner

*Primary Examiner* — Hai Huynh
(74) *Attorney, Agent, or Firm* — Oliff & Berridge, PLC

(57) ABSTRACT

A remote starting device starts up an engine when receiving an RF signal instructing to start up the engine from a remote control terminal. A first switch is provided in parallel to an accessory switch which is disposed in a first power supply line connecting a battery to an electrical device for controlling accessories. A second switch is provided in parallel to an ignition switch which is disposed in a second power supply line connecting the battery to an electrical device for controlling non-accessories. A first controller controls the second switch to be turned on when starting up the engine. A first detector detects an insertion state of a key into a key cylinder by a user. A second detector detects an electrical connection state in the first power supply line. A second controller controls the first switch to be turned off when the first detector detects that the key is inserted in a state where the engine is started up. A third controller controls the second switch to be turned off when the second detector detects that the electrical connection state of the first power supply line is changed from an electrically-connected state to an electrically-disconnected state in a state where the first switch is turned off by the second controller.

10 Claims, 18 Drawing Sheets

REMOTE STARTING DEVICE AND REMOTE STARTING METHOD

The disclosure of Japanese Patent Applications No. 2010-029429 filed on Feb. 12, 2010 and No. 2010-227615 filed on Oct. 7, 2010, including specifications, drawings and claims are incorporated herein by reference in their entireties.

BACKGROUND

The present invention relates to a technique of starting up an engine when receiving an RF signal instructing to start up the engine from a remote control terminal.

The present invention also relates to a remote starting device which automatically starts up an engine when receiving an engine starting signal wirelessly transmitted from a remote control terminal outside a vehicle.

There is a remote starting control technique of starting up an engine mounted on a vehicle by a user's operation of a remote control terminal in a remote place (hereinafter, referred to as "remote starting") and warming up the engine until the user boards the vehicle. By using this technique, the engine has been warmed up when the user boards the vehicle in cold climates. Accordingly, the vehicle can be driven forward at once.

In a control device (hereinafter, referred to as "remote starting device") starting up an engine mounted on a vehicle by such remote starting, the running of the engine is stopped when a user unlocks a door or when the user opens a door.

When the remote starting device does not stop the running of the engine but continues to run the engine, a third party who is not an authentic user may intrude into the vehicle and steal the vehicle until an authentic user arrives at the location of the vehicle from a remote place after remotely starting up the engine.

However, from the viewpoint of a user, since the engine at first remotely started up is stopped at the time of boarding the vehicle, the engine has to be started up again after boarding the vehicle, which is inconvenient.

In order to solve the inconvenience in using such a vehicle, JP-A-2009-255836 discloses a technique of a remote starting device continuing to run an engine of a vehicle after a user remotely starts up the engine, opens a door of the vehicle, and boards the vehicle.

Thereafter, when the user operates a key inserted into a key cylinder to turn on an ignition switch, the remote starting device can continue to run the engine without stopping the running of the engine.

On the other hand, when the user operates the key inserted into the key cylinder of the vehicle to turn off the ignition switch, the remote starting device has to stop the running of the engine in favor of the user's will.

The vehicle control system including the remote starting device includes power supply lines for supplying power to plural electronic controllers from a main battery.

In the power supply lines, an ignition switch used to supply or intercept the power of the main battery to the plural electronic controllers when the user operates the key inserted into the key cylinder of the vehicle to start up the engine and an ignition switch used to supply or intercept the power of the main battery to the plural electronic controllers at the time of remotely starting up the engine are connected in parallel.

When the user remotely starts up the engine and then operates the key inserted into the key cylinder to turn on the ignition switch and to turn off the ignition switch, the remote starting device has to stop the running of the engine. However, since two ignition switches are connected in parallel to each other in the power supply lines, it cannot be specified which ignition switch is turned off by the user's operation of the key only by detecting the electrical connection state of the power supply lines.

That is, the remote starting device cannot stop the running of the engine by specifying the ignition switch turned off by the user's operation of the key.

There is a vehicle mounted with a remote starting device starting an engine by operating a remote control terminal carried by a user outside the vehicle so as to warm up an engine or to air-condition a vehicle interior before driving the vehicle. The remote starting device starts up an engine in response to an engine starting signal wirelessly transmitted from the remote control terminal.

In order to prevent the theft of a vehicle when a third party enters a vehicle in which the engine has been started up by the use of the remote starting device, the remote starting device stops the engine when it detects boarding operations such as unlocking a vehicle door or opening a vehicle door.

Accordingly, an authentic user needs to insert a key into a key cylinder and to restart the engine by turning the key after boarding the vehicle.

JP-A-2009-255836 discloses a remote starting device including engine starting means for wirelessly receiving a starting instruction signal for instructing the start up of an engine of a vehicle and changing a control signal for starting up the engine to an ON state in response to the starting instruction signal and operation monitoring means for monitoring a given user operation carried out on the vehicle after the control signal is changed to the ON state. Here, the engine starting means keeps the control signal in the ON state until the user operation is ended after the control signal is changed to the ON state, and changes the control signal to an OFF state when a user operation of running the given part of the vehicle is carried out without using a portable key.

In the technique described in JP-A-2009-255836, it is possible to provide a vehicle which can prevent the theft of the vehicle by a third party while improving the convenience of the user operation, by entering a driving-enabled state without stopping the engine in a state where the engine is started up remotely.

In general, when a key is inserted into a key cylinder and the key is then turned, an accessory power switch connecting a battery to an accessory circuit is first turned on, an ignition switch connecting the battery to an ignition circuit is then turned on, and a starter switch connecting the battery to a starter circuit is turned on, whereby the engine is started up.

The remote starting device includes plural remote-starting switch circuits connecting the battery to various circuits in addition to switches such as the accessory power switch, the ignition switch, and the starter switch and starts up the engine by turning off the remote-starting switch circuits when receiving an engine starting signal wirelessly transmitted from the remote control terminal.

The remote starting device described in JP-A-2009-255836 includes an extra detector circuit that detects an operation position of the key inserted into the key cylinder in the state where the engine is remotely started up, and enters a driving-enabled state without stopping the engine in the state where the engine is remotely started up when detecting that the key is operated through the use of the detector circuit.

However, since the remote starting device disclosed in JP-A-2009-255836 enters a driving-enabled state without stopping the engine in the state where the engine is remotely started up, the detector circuit detecting that the key is operated and the ignition switch is turned on is necessary, thereby increasing the cost.

SUMMARY

It is therefore a first object of at least one embodiment of the present invention to provide a technique of a remote starting device which can specify an ignition switch turned off by a user's operation of a key and stop the running of an engine when the user remotely starts up the engine.

It is a second object of at least one embodiment of the present invention to provide a remote starting device which can enter a driving-enabled state without stopping an engine in a state where the engine is remotely started up without employing an extra detector circuit detecting that a key is operated.

In order to achieve at least one of the above-described objects, according to a first aspect of the embodiments of the present invention, there is provided a remote starting device that starts up an engine when receiving an RF signal instructing to start up the engine from a remote control terminal, the remote starting device comprising: a first switch provided in parallel to an accessory switch which is disposed in a first power supply line connecting a battery to an electrical device for controlling accessories; a second switch provided in parallel to an ignition switch which is disposed in a second power supply line connecting the battery to an electrical device for controlling non-accessories; a first controller that controls the second switch to be turned on when starting up the engine; a first detector that detects an insertion state of a key into a key cylinder by a user; a second detector that detects an electrical connection state in the first power supply line; a second controller that controls the first switch to be turned off when the first detector detects that the key is inserted in a state where the engine is started up; and a third controller that controls the second switch to be turned off when the second detector detects that the electrical connection state of the first power supply line is changed from an electrically-connected state to an electrically-disconnected state in a state where the first switch is turned off by the second controller.

With this configuration, the remote starting device controls the first switch, which is provided in parallel to the accessory switch disposed in the first power supply line connecting the battery to the electrical device controlling accessories, to be turned off when the engine is remotely started up and the user key is inserted. The remote starting device detects that the electrical connection state of the first power supply line connecting the battery to the electrical device controlling accessories is changed from the electrically-connected state to the electrically-disconnected state. The remote starting device controls the second switch, which is provided in parallel to the ignition switch disposed in the second power supply line connecting the battery to the electrical device controlling non-accessories, to be turned off.

Accordingly, the remote starting device can specify that the ignition switch of the vehicle is turned off by the user's insertion of the user key. The remote starting device can turn off the second switch provided in parallel to the ignition switch to stop the running of the engine of the vehicle by the user's turning-off of the ignition switch of the vehicle.

The third controller may control the second switch to be turned off when the second detector detects that the electrical connection state of the first power supply line is changed from the electrically-connected state to the electrically-disconnected state and the electrically-disconnected state is kept for a predetermined time or more in the state where the first switch is turned off by the second controller.

With this configuration, the remote starting device turns off the second switch when it is detected that the electrical connection state of the first power supply line connecting the battery to the electrical device controlling accessories is changed from the electrically-connected state to the electrically-disconnected state and the electrically-disconnected state is kept for a predetermined time or more in the state where the first switch which is provided in parallel to the accessory switch disposed in the first power supply line connecting the battery to the electrical device controlling accessories is turned off.

Accordingly, the remote starting device can allow the user to spend time in determining the operation details of the user key.

According to a second aspect of the embodiments of the present invention, there is provided a remote starting method for starting up an engine when receiving an RF signal instructing to start up the engine from a remote control terminal, the remote starting method comprising: (a) detecting an insertion state of a key into a key cylinder by a user; (b) controlling a first switch, which is provided in parallel to an accessory switch which is disposed in a first power supply line connecting a battery to an electrical device for controlling accessories, to be turned off when it is detected in the step of (a) that the key is inserted in a state where the engine is started up; (c) controlling a second switch, which is provided in parallel to an ignition switch which is disposed in a second power supply line connecting the battery to an electrical device controlling non-accessories, to be turned on when starting up the engine; (d) detecting an electrical connection state in the first power supply line; and (e) controlling the second switch to be turned off when it is detected in the step of (d) that the electrical connection state in the first power supply line is changed from an electrically-connected state to an electrically-disconnected state in a state where the first switch is turned off in the step of (b).

With this configuration, the remote starting method controls the first switch, which is provided in parallel to the accessory switch disposed in the first power supply line connecting the battery to the electrical device controlling accessories, to be turned off when the engine is remotely started up and the user key is inserted. The remote starting method detects that the electrical connection state of the first power supply line connecting the battery to the electrical device controlling accessories is changed from the electrically-connected state to the electrically-disconnected state. The remote starting method controls the second switch, which is provided in parallel to the ignition switch disposed in the second power supply line connecting the battery to the electrical device controlling non-accessories, to be turned off.

Accordingly, the remote starting method can specify that the ignition switch of the vehicle is turned off by the user's insertion of the user key. The remote starting method can turn off the second switch provided in parallel to the ignition switch to stop the running of the engine of the vehicle by the user's turning-off of the ignition switch of the vehicle.

The step of (e) may include controlling the second switch to be turned off when it is detected in the step of (d) that the electrical connection state in the first power supply line is changed from the electrically-connected state to the electrically-disconnected state and the electrically-disconnected state is kept for a predetermined time or more in the state where the first switch is turned off in the step of (b).

With this configuration, the remote starting method turns off the second switch when it is detected that the electrical connection state of the first power supply line connecting the battery to the electrical device controlling accessories is changed from the electrically-connected state to the electrically-disconnected state and the electrically-disconnected state is kept for a predetermined time or more in the state where the first switch which is provided in parallel to the accessory switch disposed in the first power supply line connecting the battery to the electrical device controlling accessories is turned off.

Accordingly, the remote starting method can allow the user to spend time in determining the operation details of the user key.

According to a third aspect of the embodiments of the present invention, there is provided a remote starting device that starts up an engine of a vehicle when receiving an engine starting signal wirelessly transmitted from a remote control terminal, the remote starting device comprising: a starting control unit that turns on at least a first switch which is provided in parallel to an ignition switch which is disposed in a path connecting a battery to an ignition device so as to start up the engine when receiving the engine starting signal; an operation state detecting unit that detects a key insertion operation of inserting a key into a key cylinder by an operator; and a remote control stopping unit that turns off the first switch when the operation state detecting unit detects that the key is inserted into the key cylinder and it is detected that an electrical connection state of a path connecting the battery to an accessory device is changed from an electrically-disconnected state to an electrically-connected state after the engine is started up by the starting control unit.

With this configuration, when the insertion of the key into the key cylinder is detected by the operation state detecting unit after the engine is started up by the starting control unit, the remote control stopping unit detects that the electrical connection state of the path connecting the battery to the accessory device is changed from the electrically-disconnected state to the electrically-connected state. On the basis of a variation in voltage at that time, it can be determined at least whether the accessory switch is turned on or off by the operation of the key. On the basis of the determination result, it is estimated whether the ignition switch is turned on. On the basis of the estimation result, it is determined whether or not to stop the remote control.

The remote starting device may further comprise a second switch controller that controls an ON/OFF state of a second switch which is provided in parallel to an accessory switch which is disposed in the path connecting the battery to the accessory device, the operation state detecting unit may detect that the electrical connection state of the path connecting the battery to the accessory device is changed from the electrically-disconnected state to the electrically-connected state on the basis of a variation in voltage of a connection point between the accessory device and the second switch when the second switch is controlled to be turned off by the second switch controller.

When the starting control unit receives the engine starting signal, the second switch controller may control the second switch to be turned on, and when the operation state detecting unit detects that the key is inserted into the key cylinder, the second switch controller may control the second switch to be turned off and then the remote control stopping unit may detect the variation in voltage.

When the starting control unit receives the engine starting signal, the second switch controller may control the second switch to be turned on, and when the operation state detecting unit detects an operator's operation of boarding the vehicle, the second switch controller may control the second switch to be turned off and then the remote control stopping unit may detect the variation in voltage.

The remote starting device may further comprise a setting unit that selects whether the second switch is to be turned on when the starting control unit turns on the first switch so as to start up the engine.

Selection information to be set in the setting unit may be wirelessly transmitted from the remote control terminal.

According to the third aspect of the embodiments of the present invention, it is possible to provide a remote starting device which can enter a driving state without stopping an engine in the state where the engine is remotely started up, without employing an extra detector circuit detecting that a key is operated.

DETAILED DESCRIPTION OF THE EMBODIMENTS

First Embodiment

Figure 1:
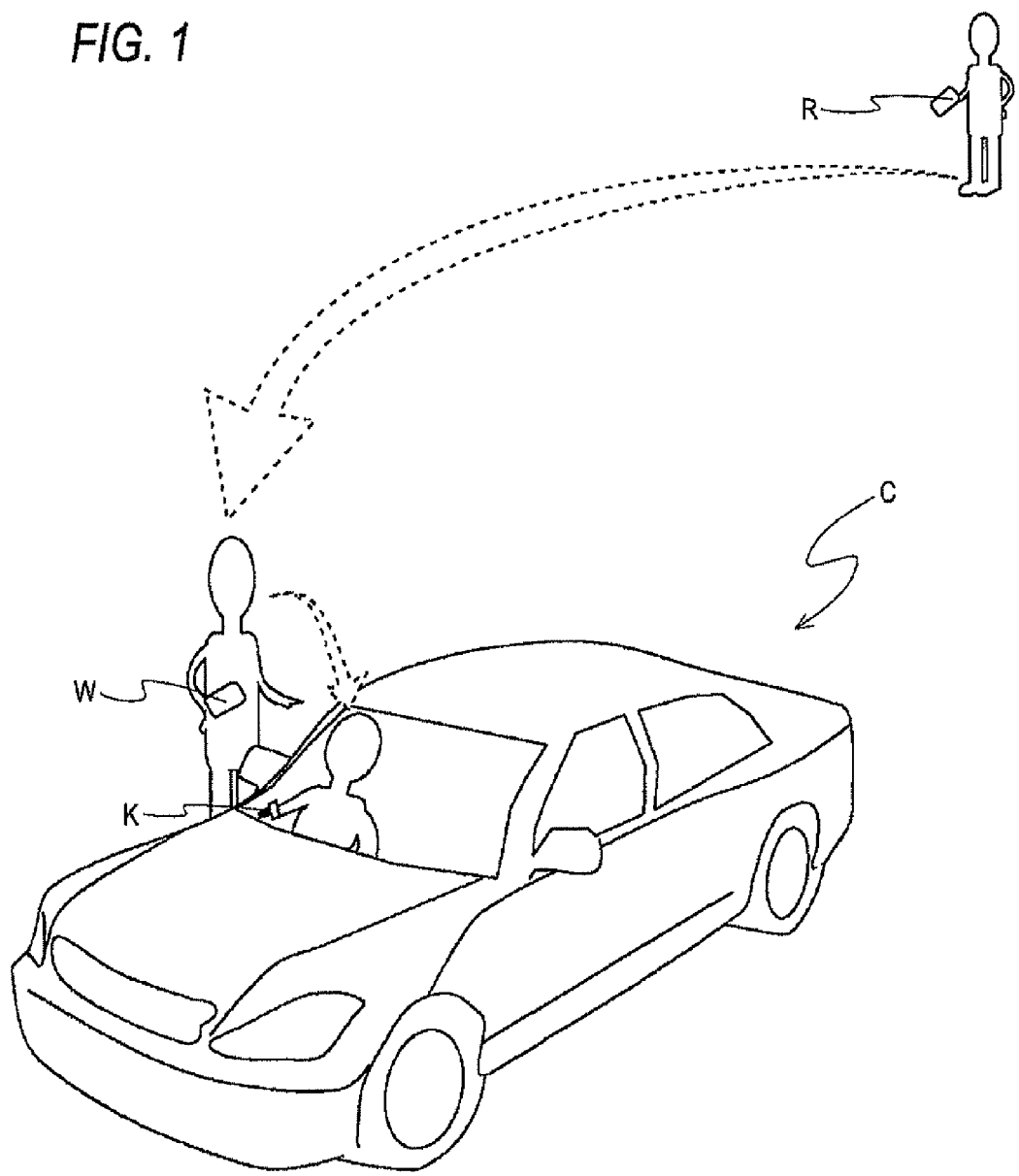
FIG. 1 is a diagram illustrating a vehicle and a user's motion.

Hereinafter, a vehicle control system according to a first embodiment of the invention will be described with reference to the accompanying drawings:

First, as shown in FIG. 1, the configuration of a system for embodying a technique of starting up an engine mounted on a vehicle C when receiving an RF signal instructing to start up the engine from a remote control terminal R (hereinafter, also referred to as "remote starting") and of stopping the engine when predetermined conditions are satisfied after a door of the vehicle C is unlocked based on a signal transmitted from a wireless key W and a user key K is inserted into a key cylinder, that is, a vehicle control system, will be described below.

<Configuration of Vehicle Control System>

Figure 2:
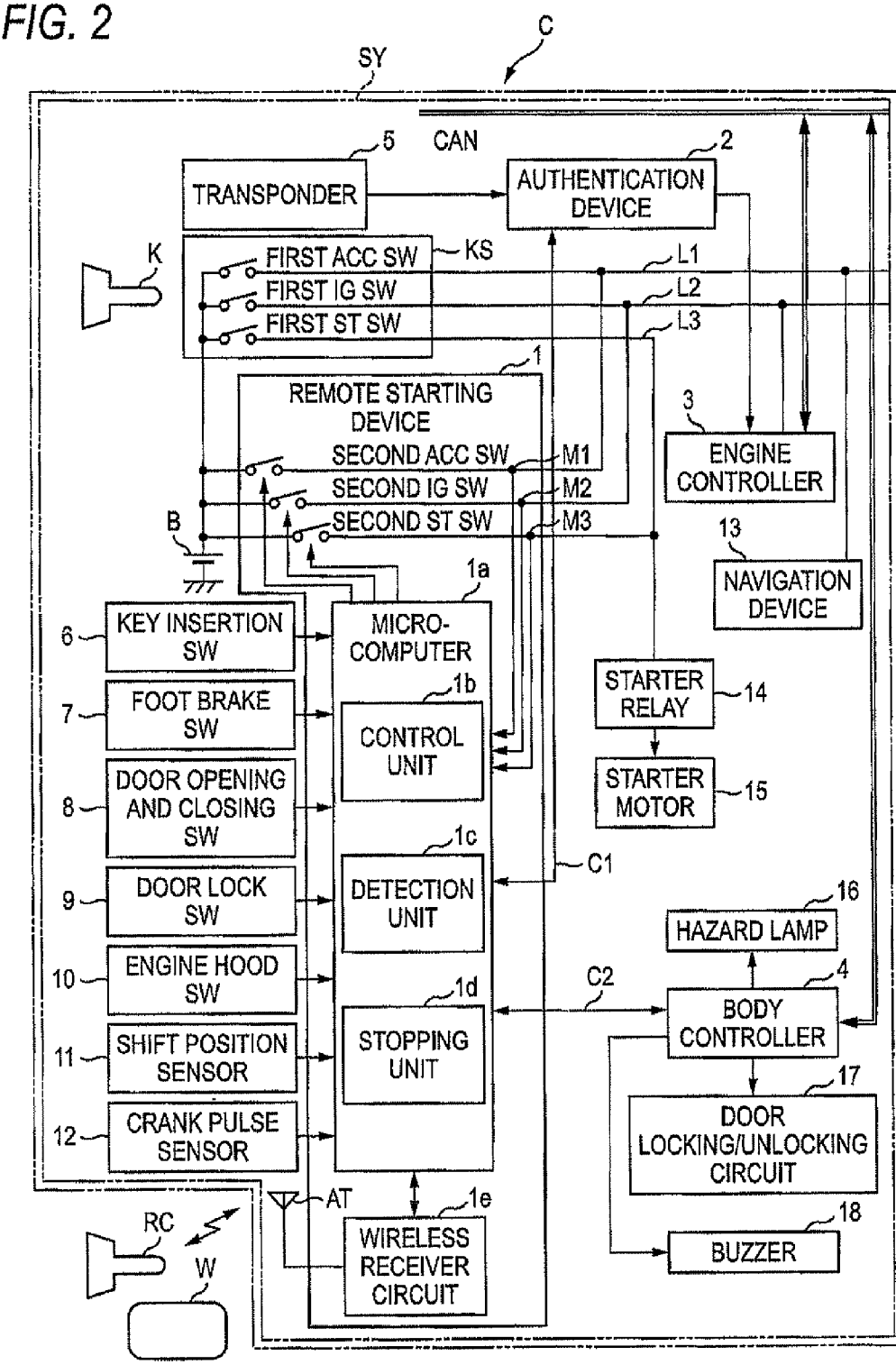
FIG. 2 is a diagram illustrating the configuration of a system including a remote starting device according to a first embodiment of the present invention.

FIG. 2 is a diagram illustrating the configuration of a vehicle control system SY. The vehicle control system SY includes a key cylinder KS, a remote starting device 1, an authentication device 2, an engine controller 3, a body controller 4, a transponder 5, a key insertion switch 6, a foot brake switch 7, a door opening and closing switch 8, a door lock switch 9, an engine hood switch 10, a shift position sensor 11, a crank pulse sensor 12, a navigation device 13, a starter relay 14, a starter motor 15, a hazard lamp 16, a door locking/unlocking circuit 17, and a buzzer 18.

These electrical devices are classified into accessory electrical devices and non-accessory electrical devices. For example, the navigation device 13 is classified as an accessory electrical device. The engine controller 3 is classified as a non-accessory electrical device.

The vehicle control system SY electrically connects the remote starting device 1 and the like to each other via signal lines.

Figure 3:
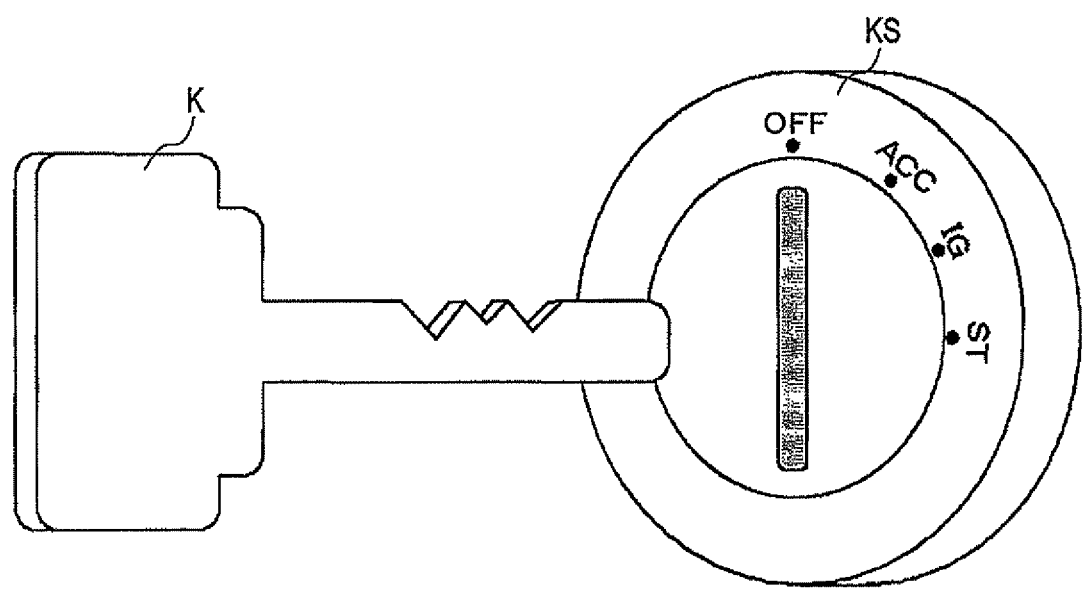
FIG. 3 is a diagram illustrating a key and a key cylinder.

The key cylinder KS is disposed in the vicinity of a steering wheel of a vehicle C. As shown in FIG. 3, the key cylinder KS is configured so that a user can insert a user key K into the key cylinder KS. The key cylinder KS includes a first accessory switch, a first ignition switch, and a first starter switch.

The first accessory switch is a switch used to supply or intercept power of a battery B to an electrical device controlling the accessories. The first ignition switch is a switch used to supply or intercept power of the battery B to an electrical device controlling the non-accessories. The first starter switch is a switch used to supply or intercept power of the battery B to the starter motor.

Figure 4:
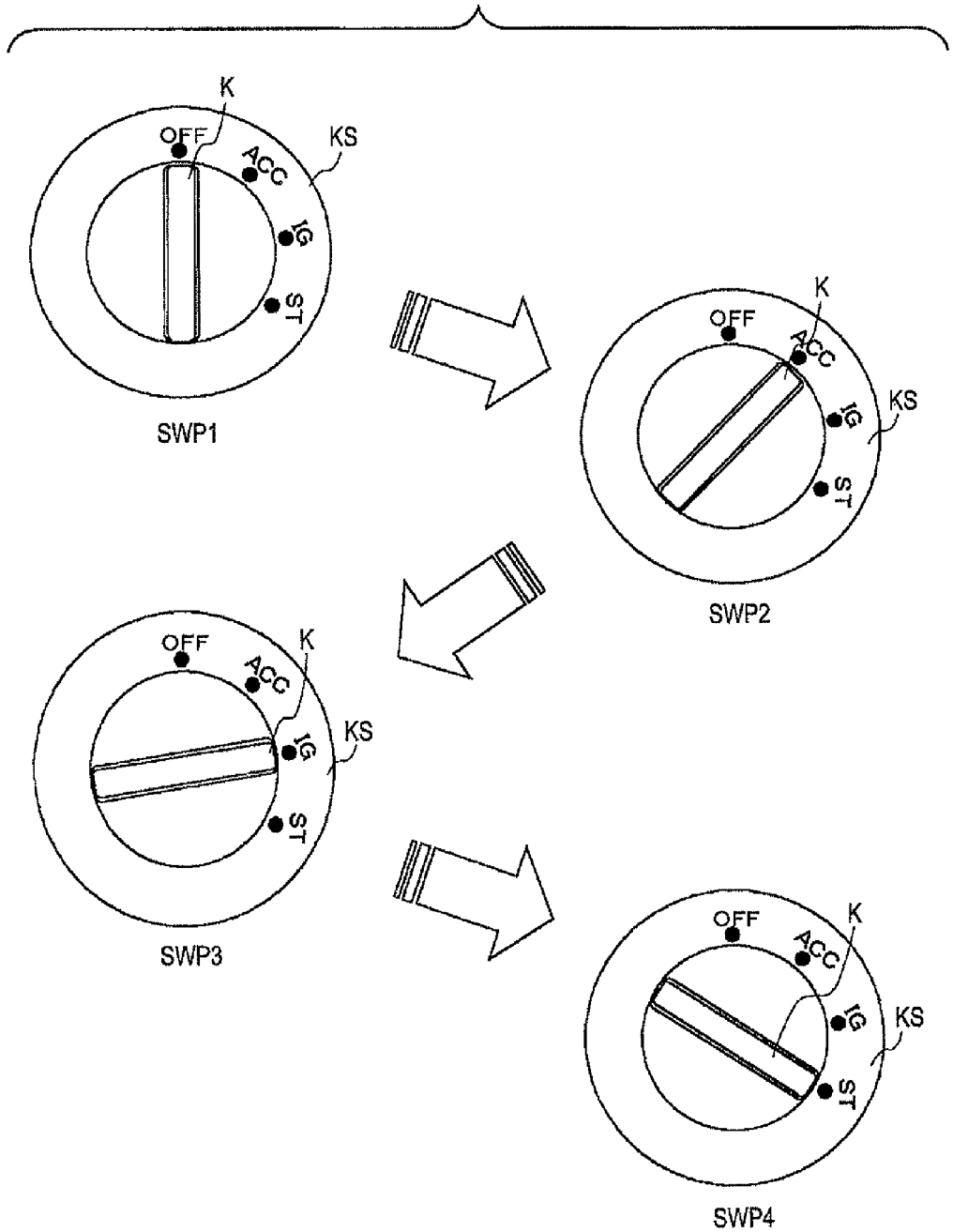
FIG. 4 is a diagram illustrating operation states of the key inserted into the key cylinder.

When it is inserted into the key cylinder KS, the user key K is located at an OFF position (SWP1) as shown in FIG. 4.

As shown in FIG. 4, when the user turns the user key K from the position where it is inserted into the key cylinder KS by a predetermined angle, the first accessory switch is turned on (SWP2).

As shown in FIG. 4, when the user turns the user key K from the position where the first accessory switch is turned on by a predetermined angle, the first ignition switch is turned on (SWP3).

As shown in FIG. 4, when the user turns the user key K from the position where the first ignition switch is turned on by a predetermined angle, the first starter switch is turned on (SWP4).

Therefore, since the key cylinder KS including the switches have the above-mentioned configuration, the first accessory switch is necessarily turned on when the first ignition switch is turned on. The first ignition switch is necessarily turned on when the first starter switch is turned on.

On the contrary, the first ignition switch is necessarily turned off when the first accessory switch is turned off. The first starter switch is necessarily turned off when the first ignition switch is turned off.

The remote starting device 1 includes a microcomputer 1a, a second accessory switch, a second ignition switch, a second starter switch, and a wireless receiver circuit 1e.

The microcomputer 1a includes a control unit 1b performing a control of remotely starting an engine and a control of turning on/off the second accessory switch and the like a detection unit 1c detecting a user's operation states on a vehicle C and detecting electrical connection states of power supply lines. The details of the controls performed by the control unit 1b and the like will be described later.

The microcomputer 1a further includes, for example, a ROM storing a program of the control performed by the control unit 1b and the like, a CPU executing the program stored in the ROM, and a RAM serving as a working area when the CPU executes the program.

The second accessory switch is a switch used to supply or intercept power from a battery B to accessory electrical devices of the vehicle C when the remote starting device 1 remotely starts up the engine.

The second ignition switch is a switch used to supply or intercept power from the battery B to electrical devices, that is, the non-accessory electrical devices, other than the accessory electrical devices of the vehicle C when the remote starting device 1 remotely starts up the engine.

The second starter switch is a switch used to supply or intercept power from the battery B to the starter motor 15 of the vehicle C when the remote starting device 1 remotely starts up the engine.

The wireless receiver circuit 1e is a circuit receiving a signal wirelessly transmitted from a remote control terminal RC.

The authentication device 2 performs an authentication process on the basis of an ID signal wirelessly received from the user key K when the user key K which is a key necessary for starting the driving of the vehicle C is inserted into the key cylinder KS of the vehicle C by the user. The details of the authentication process will be described later.

The engine controller 3 controls the running of the engine of the vehicle C. Specifically, the engine controller 3 controls an ignition plug, an injector, and a throttle motor of the vehicle C to control the running of the engine.

The body controller 4 controls the hazard lamp 16, the door locking/unlocking circuit 17, and the buzzer 18 on the basis of the authentication result received from the authentication device 2. For example, the body controller 4 controls the hazard lamp or the buzzer 18 to inform outside of the theft of the vehicle C when the authentication result received from the authentication device 2 is "failure".

The transponder 5 is a receiver wirelessly receiving the ID signal from the user key K when the user key K is inserted into the key cylinder KS of the vehicle C by the user. The transponder 5 transmits the received ID signal to the authentication device 2 via a signal line.

The key insertion switch 6 detects the insertion state of the user key K and outputs the detection result to the remote starting device 1.

The foot brake switch 7 detects the user's operation on the foot brake switch 7 and outputs the detection result to the remote starting device 1 and the like.

The door opening and closing switch 8 detects the operation state of a door and outputs the detection result to the remote starting device 1 and the like. The door opening and closing switch 8 is, for example, a courtesy switch.

The door lock switch 9 detects the locking/unlocking state of the door and outputs the detection result to the remote starting device 1 and the like.

The engine hood switch 10 detects the opening and closing state of an engine hood and outputs the detection result to the remote starting device 1 and the like.

The shift position sensor 11 detects a position of a shift lever and outputs the detection result to the remote starting device 1 and the like.

The crank pulse sensor 12 detects sawteeth of a rotation shaft of the engine and outputs the detected pulse signal to the remote starting device 1 and the like.

The navigation device 13 includes a display unit and a recording unit in which map information and the like are recorded. The navigation device 13 displays a current position of the vehicle C on the display unit along with a map.

The starter relay 14 is a relay supplying power from the battery B to the starter motor 15 when the first starter switch or the second starter switch is turned on.

The starter motor 15 is a motor assisting the engine with rotary power when the remote starting device 1 or the engine controller 3 cranks the engine.

The hazard lamp 16 is a lamp flickering under the control of the body controller 4. The hazard lamp 16 flickers to alert the surroundings of the vehicle C.

The door locking/unlocking circuit 17 locks or unlocks a door of the vehicle C on the basis of a signal from the body controller 4.

The buzzer 18 is a buzzer ringing under the control of the body controller 4. The buzzer 18 buzzes to alert the surroundings of the vehicle C.

Here, power supply lines of the vehicle control system SY for supplying power to the electrical device controlling the accessories and the electrical device controlling the non-accessories from the battery B depending on the user's operation of the key and the user's operation of the remote control terminal and the configurations will be described.

As shown in FIG. 2, in the vehicle control system SY, the first accessory switch of the key cylinder KS and the second accessory switch of the remote starting device 1 are connected in parallel to each other in a power supply line L1 for supplying power to the electrical device controlling the accessories from the battery B.

In the vehicle control system SY, the first ignition switch of the key cylinder KS and the second ignition switch of the remote starting device 1 are connected in parallel to each other in a power supply line L2 for supplying power to the electrical device controlling the non-accessories from the battery B.

In the vehicle control system SY, the first starter switch of the key cylinder KS and the second starter switch of the remote starting device 1 are connected in parallel to each other in a power supply line L3 for supplying power to the starter motor 15 from the battery B.

Hereinafter, the first accessory switch, the first ignition switch, and the first starter switch are called first switch group. The second accessory switch, the second ignition switch, and the second starter switch are called second switch group.

The power supply lines L1, L2, and L3 are connected to ends of a monitor line M1, a monitor line M2, and a monitor line M3 monitoring the ON/OFF state of the switches on the opposite side of the battery B about the first switch group and the second switch group connecting the power supply lines.

The other ends of the monitor lines M1, M2, and M3 are connected to the remote starting device 1.

Therefore, the remote starting device 1 can determine the ON/OFF states of the first switch group and the second switch group by monitoring the monitor lines M1, M2, and M3.

However, the power supply lines L1 and L2 of the vehicle control system SY connect the first switch group and the second switch group in parallel to each other among the battery B, the electrical device controlling the accessories, and the engine controller 3. The monitor lines M1, M2, and M3 are connected to the opposite side of the battery B about the first switch group and the second switch group.

Accordingly, the remote starting device 1 cannot determine which of the first accessory switch and the second accessory switch is turned on/off or which of the first ignition switch and the second ignition switch is turned on/off, even by monitoring the monitor lines M1, M2, and M3.

Figure 5:
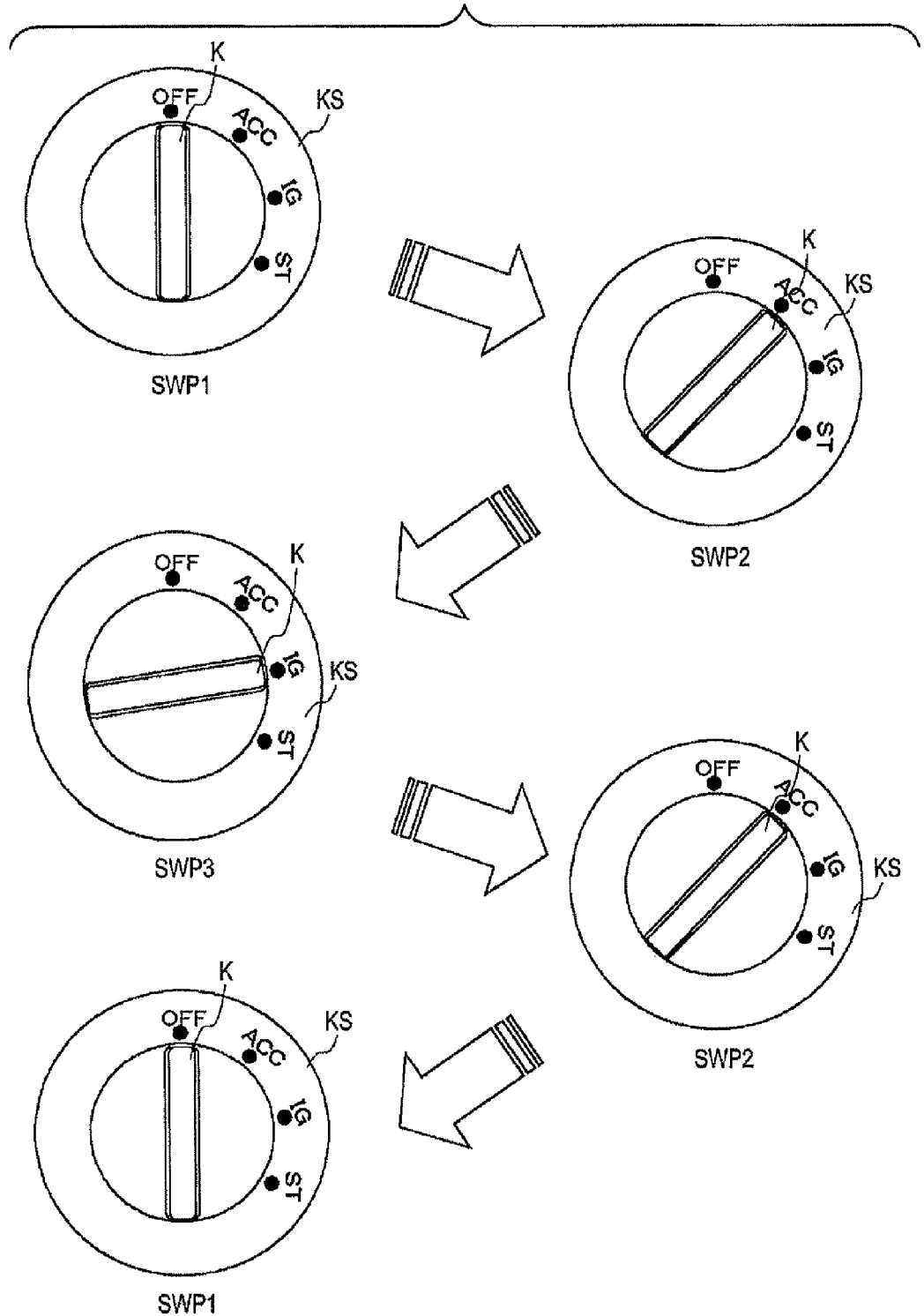
FIG. 5 is a diagram illustrating operation states of the key inserted into the key cylinder.

For example, when a user remotely starts up the engine of the vehicle C, boards the vehicle C, and operates the user key K inserted into the key cylinder KS as shown in FIG. 5, the remote starting device 1 cannot determine the ON/OFF state of the first ignition switch of the key cylinder KS.

In the operations of the user key K shown in FIG. 5, the user operates the user key K inserted into the key cylinder KS to turn the user key K from the OFF position (SWP1) to the position (SWP2) where the first accessory switch is turned on. Then, the user operates the user key K to turn the user key K from the position where the first accessory switch is turned on to the position (SWP3) where the first ignition switch is turned on. Then, the user operates the user key K to turn the user key K from the position where the first ignition switch is turned on to the position (SWP2) where the first accessory switch is turned on. Then, the user operates the user key K to turn the user key K from the position where the first accessory switch is turned on to the position (SWP1) where all the switches are turned off.

In theses operations, the remote starting device 1 turns on the second accessory switch and the second ignition switch thereof since it remotely starts up the engine already.

Therefore, the power supply lines L1 and L2 are in the electrically-connected state already and the remote starting device 1 cannot confirm the ON/OFF states of the first accessory switch and the first ignition switch of the key cylinder KS even by monitoring the power supply lines L1 and L2 by the use of the monitor lines M1 and M2.

That is, after the engine is remotely started up, when the user operates the user key K, inserts the user key into the key cylinder KS, turns on the first ignition switch, and then turns off the first ignition switch, the remote starting device 1 has to stop the running of the engine. However, as described above, it is not possible to specify the ON/OFF states of the first accessory switch and the first ignition switch due to the user's operation of the user key and it is thus not possible to stop the running of the engine.

Therefore, the remote starting device 1 performs a procedure (key operation specifying procedure) of stopping the running of the engine depending on the user's operation of the user key after the engine is remotely started up.

The vehicle control system SY performs various procedures. Various procedures include, for example, an engine starting procedure of normally starting up the engine without remotely starting up the engine, an authentication procedure of authenticating the ID signal wirelessly received from the user key K or the like, a remote engine starting procedure of starting up the engine by remote control, a remote starting stopping procedure of stopping the remote engine starting procedure, and a key operation specifying procedure of stopping the running of the engine depending on the user's operation of the key.

Details thereof will be described below.

<Engine Starting Procedure>

An engine starting procedure will be first described. The engine starting procedure is embodied mainly by the user key K, the key cylinder KS, the starter relay 14; the starter motor 15, the engine, and the engine controller 3.

A user inserts the user key K into a key insertion hole of the key cylinder KS and turns the user key up to a position where the first starter switch is turned on. In the vehicle control system SY, when the first starter switch is turned on, the battery B is electrically connected to the starter motor 15 and thus the starter motor 15 is activated. That is, the user can activate the starter motor 15 by turning the user key K to turn on the first starter switch.

Therefore, the user starts up the engine by determining that the rotation rate of the engine reaches a predetermined rotation rate (for example, 1000 rpm) on the basis of an engine sound and the like and stopping the turning operation.

On the other hand, the engine controller 3 controls the ignition plug, the injector, and the throttle motor of the engine to start up the engine when receiving a first starter switch signal. The engine controller 3 controls the ignition plug or the injector with the assistance of the starter motor until the engine rotation rate determined on the basis of the signal received from the crank pulse sensor 12 reaches a predetermined rotation rate. That is, the engine controller 3 performs the cranking control.

<Authentication Procedure>

The authentication procedure will be then described. The authentication procedure is mainly embodied by the remote control terminal RC, the wireless key W, the user key K, an antenna AT, the transponder 5, the authentication device 2, and the engine controller 3.

The authentication procedure using the user key K will be described below. When the user inserts the user key K into the key insertion hole, the transponder 5 wirelessly receives an ID signal from the user key K. The transponder 5 transmits the received ID signal to the authentication device 2.

The authentication device 2 determines whether the received ID signal is matched with an ID signal stored in advance, and transmits a signal representing "success" as the authentication result to the engine controller 3 when both are matched with each other.

When both are not matched with each other, the authentication device 2 transmits a signal representing "failure" as the authentication result to the engine controller 3. The engine controller 3 performs an engine starting procedure when receiving the first starter switch signal and the signal representing "success" as the authentication result.

The authentication procedure using the wireless key W will be described below. The user operates the wireless key W to transmit an instruction signal for unlocking the door of the vehicle C and the ID signal to the vehicle control system SY. At this time, the authentication device 2 of the vehicle control system SY receives the instruction signal for unlocking the door via the antenna AT.

The authentication device 2 determines whether the ID signal received along with the instruction signal for unlocking the door is matched with the ID signal stored in advance, and transmits the signal representing "success" as the authentication result to the body controller 4 when both are matched with each other.

The authentication device 2 transmits the signal representing "failure" as the authentication result to the body controller 4 when both are not matched with each other.

The body controller 4 unlocks the door of the vehicle C when receiving the signal representing "success" as the authentication result, and does not unlock the door of the vehicle C when receiving the signal representing "failure" as the authentication result.

Therefore, since the vehicle control system SY unlocks the door of the vehicle C, the user can open the door by pulling a knob of the door.

<Remote Engine Starting Procedure>

The remote engine starting procedure will be described below.

The remote engine starting procedure is mainly embodied by the remote control terminal RC, the antenna AT, the remote starting device 1, the starter relay 14, the starter motor 15, and the engine controller 3.

When the user operates an engine starting button of the remote control terminal RC, the remote control terminal RC wirelessly transmits a signal instructing to start up the engine to the remote starting device 1 mounted on the vehicle C in response to the operation.

The control unit 1b of the remote starting device 1 starts up the engine on the basis of the signal instructing to start up the engine, which is received via the antenna AT and the wireless receiver circuit 1e.

At the time of remotely starting up the engine, the remote starting device 1 turns on the second accessory switch, the second ignition switch, and the second starter switch thereof when receiving the signal instructing to start up the engine.

In response to the turning-on of the switches, the vehicle control system SY supplies power from the battery B to the electrical device controlling the accessories, the electrical device controlling the non-accessories, and the starter motor 15.

The vehicle control system SY has two modes of a normal mode and a run-on mode in the remote engine starting procedure. The modes can be selected by the use of a switch disposed in the remote control terminal RC or the vehicle. The details of the modes will be described below.

(Normal Mode)

The normal mode will be first described. It is assumed that the normal mode is set in the vehicle control system SY by the user. Then, when the engine of the vehicle C is remotely started up by the user's operation on the remote control terminal RC and then the user opens the door of the vehicle C and boards the vehicle C, the vehicle control system SY stops the running of the engine.

Accordingly, even when a non-authentic user intends to enter the vehicle C and to steal and drive the vehicle C of which the engine is being run until the user boards the vehicle C after remotely starting up the engine of the vehicle C by the use of the remote control terminal RC in a remote place, the running of the engine is stopped at the time of opening the door of the vehicle C, thereby preventing such theft.

On the other hand, since the engine of the vehicle C at first remotely started up by the use of the remote control terminal RC is stopped with the boarding, the user has to restart the engine at the time of boarding the vehicle C, which is inconvenient to the user.

(Run-On Mode)

Then, the run-on mode will be described. It is assumed that the vehicle control system SY is set to the run-on mode by the user. Then, even when the user remotely starts up the engine of the vehicle C with the operation on the remote control terminal RC, then unlocks the door of the vehicle C by the use of the wireless key W, then opens the door of the vehicle C, and boards the vehicle C, the vehicle control system SY does not stop the running of the engine but continues to run the engine.

When a predetermined operation is performed by the user after the user boards the vehicle C, the vehicle control system SY continues to run the engine to drive the vehicle C. When another predetermined operation is performed at this time, the vehicle control system SY continues to stop the running of the engine.

<Remote Starting Stopping Procedure>

A remote starting stopping procedure will be described below.

The remote starting stopping procedure is mainly embodied by the remote starting device 1, the key insertion switch 6, the foot brake switch 7, and the engine controller 3.

The control unit 1b of the remote starting device 1 performs the above-mentioned remote starting procedure in response to an RF signal from the remote control terminal RC to start up the engine of the vehicle C.

Thereafter, the detection unit 1c of the remote starting device 1 stops the driving control of the engine by the use of the stopping unit 1d and causes the engine controller 3 to control the driving of the engine, when detecting a specific signal.

That is, the detection unit 1c of the remote starting device 1 detects that the user key K is inserted into the key cylinder KS on the basis of the signal from the key insertion switch 6 which is a specific signal.

The detection unit 1c of the remote starting device 1 detects that the foot brake is pedaled on the basis of the signal from the foot brake switch 7 which is a specific signal.

The detection unit 1c of the remote starting device 1 detects that the foot brake is changed from a pedaled state to a non-pedaled state on the basis of the signal from the foot brake switch 7 which is a specific signal after detecting the above-mentioned states.

When the above-mentioned states are detected by the detection unit 1c, the stopping unit 1d of the remote starting device 1 turns off the second ignition switch and the second accessory switch to changes the engine from the remotely-started state to the normal engine control state by the engine controller 3.

Hereinafter, the user's operation of causing a specific signal to be generated is referred to as "driving start operation".

Accordingly, even when the user performs the normal driving start operation after the user remotely starts up the engine of the vehicle C and then boards the vehicle C, the engine of the vehicle C is not stopped as long as the user inserts the user key K into the key cylinder KS. That is, the running of the engine is not stopped against the user's will of continuing to run the engine of the vehicle C.

<Key Operation Specifying Procedure>

The key operation specifying procedure will be described below.

The key operation specifying procedure is mainly embodied by the remote starting device 1, the key insertion switch 6, the first switch group, the second switch group, the power supply lines L1, L2, and L3, and the monitor lines M1, M2, and M3.

The remote starting device 1 performs the key operation specifying procedure until the remote starting stopping procedure is performed after the remote starting procedure is performed.

The detection unit 1c of the remote starting device 1 detects the insertion of the user key K into the key cylinder KS on the basis of the signal received from the key insertion switch 6 after the engine of the vehicle C is remotely started up by the remote starting procedure. That is, the remote starting device 1 detects the insertion of the user key K into the key cylinder KS when receiving the ON signal from the key insertion switch 6.

When the detection unit 1c of the remote starting device 1 detects the insertion of the user key K after the engine of the vehicle C is remotely started up, the control unit 1b of the remote starting device 1 performs the control of turning off the second accessory switch thereof.

The detection unit 1c of the remote starting device 1 detects the electrical connection state of the power supply line L1 on the basis of the signal from the monitor line M1 after turning off the second accessory switch thereof.

That is, when it turns off the second accessory switch to change the electrical connection state of the power supply line L1 from the electrically-connected state to the electrically-disconnected state, the remote starting device 1 can confirm that the user operates the user key K inserted into the key cylinder KS to the OFF state. That is, the remote starting device 1 can confirm the user's will to end the vehicle control system SY in this case.

Therefore, when the remote starting device 1 confirms the user's will to end the vehicle control system SY, the control unit 1b of the remote starting device 1 performs the control of turning off the second accessory switch and the second ignition switch.

Accordingly, the remote starting device 1 can confirm the user's will to end the vehicle control system SY, even when the first ignition switch is turned on and the first accessory switch is turned off by the user key K inserted into the key cylinder KS by the user after the engine is remotely started up.

When the remote starting device 1 confirms the user's will to end the vehicle control system SY, the remote starting device 1 performs the control of turning off the second ignition switch to stop the running of the engine of the vehicle C.

It has been described above that "When the detection unit 1c of the remote starting device 1 detects the insertion of the user key K after remotely starting up the engine of the vehicle C, the control unit 1b of the remote starting device 1 performs the control of turning off the second accessory switch thereof."

However, even when the control unit 1b of the remote starting device 1 does not perform the control of turning off the second accessory switch but performs the control of turning off the second ignition switch, it may be considered that the user's will to end the vehicle control system SY can be specified.

If the control unit 1b of the remote starting device 1 performs the control of turning off the second ignition switch thereof, the following problem is caused.

That is, when the user remotely starts up the engine of the vehicle C, then boards the vehicle C, and turns the user key K inserted into the key cylinder KS up to only the position where the second accessory switch is turned on and the control unit 1b of the remote starting device 1 turns off the second ignition switch, the running of the engine of the vehicle C is stopped.

Therefore, in order to avoid such a problem, that is, a problem that the running of the engine is stopped regardless of the user's will after the engine of the vehicle C is remotely started up, the remote starting device 1 performs the above-mentioned control.

<Timing Diagram of Control Procedure>

Figure 6:
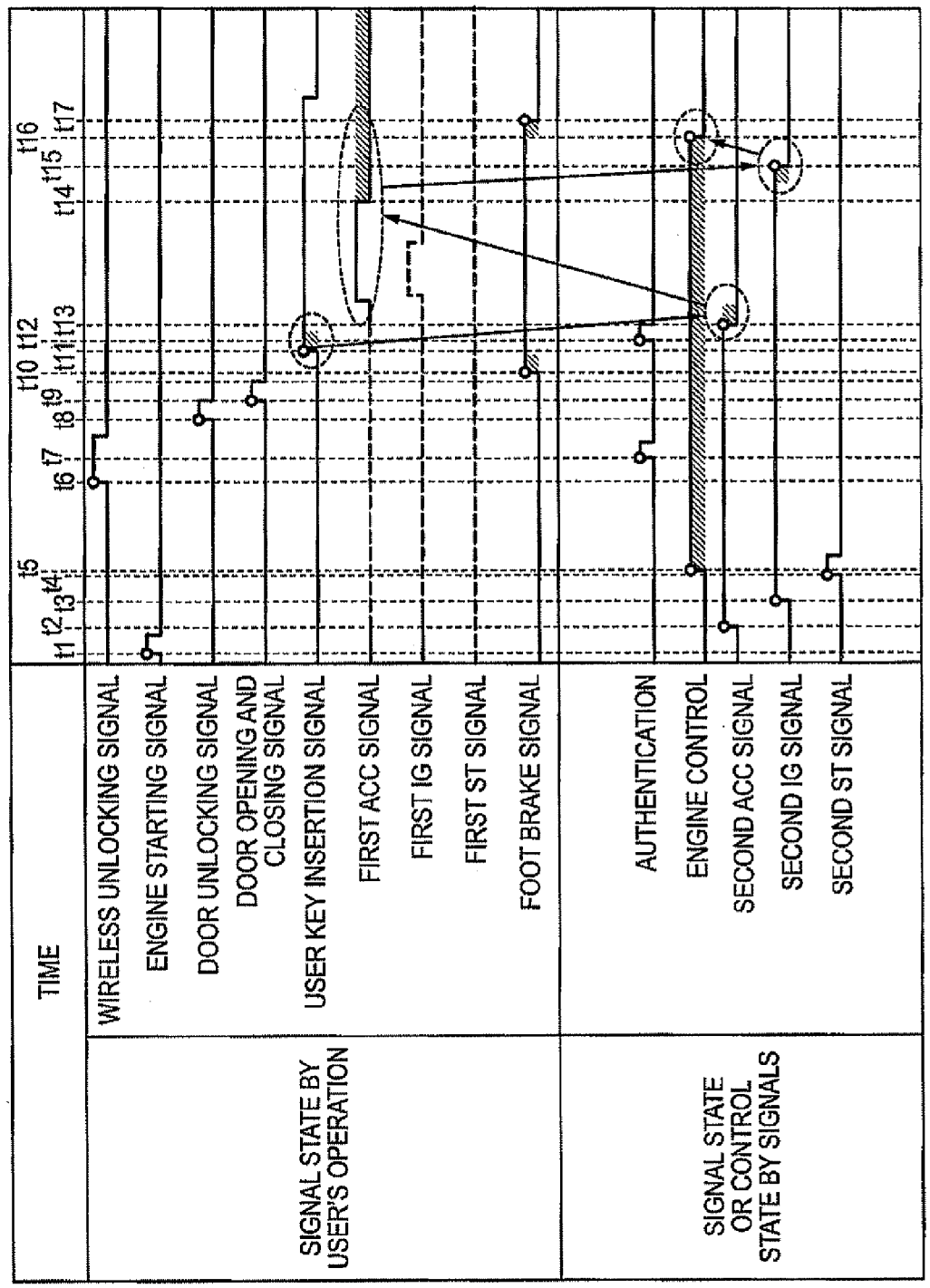
FIG. 6 is a timing diagram illustrating a control procedure of the remote starting device according to the first embodiment.

FIG. 6 is a timing diagram illustrating the control procedure performed by the vehicle control system SY. The control procedure performed by the vehicle control system SY will be described below with reference to the timing diagram.

In the vehicle control system SY, a signal for controlling the first accessory switch of the key cylinder KS is referred to as a first ACC signal, a signal for controlling the first ignition switch is referred to as a first 1G signal, and a signal for controlling the first starter switch is referred to as a first ST signal.

In the vehicle control system SY, a signal for controlling the second accessory switch of the remote starting device 1 is referred to as a second ACC signal, a signal for controlling the second ignition switch is referred to as a second 1G signal, and a signal for controlling the second starter switch is referred to as a second ST signal.

(Time t1)

At time t1, the remote starting device 1 of the vehicle control system SY receives an RF signal instructing to start up the engine from the remote control terminal RC.

Accordingly, the remote starting device 1 performs the remote engine starting procedure. At this time, it can be said that the vehicle control system SY starts up the engine.

(Time t2)

At time t2, the control unit 1b of the remote starting device 1 of the vehicle control system SY performs the control of turning off the second accessory switch thereof. That is, the control unit 1b of the remote starting device 1 changes the second ACC signal for turning off the second accessory switch to the ON state.

(Time t3)

At time t3, the control unit 1b of the remote starting device 1 of the vehicle control system SY performs the control of turning off the second ignition switch thereof. That is, the control unit 1b of the remote starting device 1 changes the second TO signal for turning off the second ignition switch to the ON state.

(Time t4)

At time t4, the control unit 1b of the remote starting device 1 of the vehicle control system SY performs the control of turning off the second starter switch thereof. That is, the control unit 1b of the remote starting device 1 changes the second ST signal for turning off the second starter switch to the ON state. That is, it can be said that the vehicle control system SY starts up the engine at this time.

(Time t5)

At time t5, since the remote starting device 1 keeps the second starter switch in the ON state for a predetermined time, the starter motor 15 of the vehicle control system SY is activated to assist the engine of the vehicle C with the rotation. Since the remote starting device 1 turns on the second ignition switch, the engine controller 3 is activated to run the engine with the assistance of the starter motor 15.

That is, the remote starting device 1 remotely starts up the engine on the basis of the RF signal instructing to start up the engine from the remote control terminal RC.

(Time t6)

At time t6, the remote starting device 1 of the vehicle control system SY receives the RF signal instructing to unlock the door and the ID signal from the wireless key W. The remote starting device 1 transmits the RF signal instructing to unlock the door and the ID signal to the authentication device 2 of the vehicle control system SY.

(Time t7)

At time t7, the authentication device 2 of the vehicle control system SY performs the above-mentioned authentication procedure using the wireless key W since it receives the RF signal instructing to unlock the door from the wireless key W. The authentication device 2 transmits a signal representing "success" as the authentication result of the authentication procedure to the body controller 4.

(Time t8)

At time t8, the signal input to the body controller 4 of the vehicle control system SY from the authentication device 2, that is, the door unlocking signal, is changed to the ON state. That is, the body controller 4 unlocks the door of the vehicle C, since it receives the signal representing "success" as the authentication result.

(Time t9)

At time t9, the signal input to the remote starting device 1 of the vehicle control system SY from the door lock switch 9, that is, the opening and closing signal of the door of the vehicle C, is changed to the ON state.

That is, since the door of the vehicle C is unlocked by the body controller 4, the user can open the door. At this time, the door lock switch 9 outputs an ON signal to the remote starting device 1.

(Time t10)

At time t10, the signal input to the detection unit 1c of the remote starting device 1 of the vehicle control system SY from the foot brake switch 7, that is, the foot brake signal, is changed to the ON state.

That is, when the user pedals the foot brake, the foot brake switch 7 outputs an ON signal to the detection unit 1c of the remote starting device 1.

(Time t11)

At time t11, the signal input to the detection unit 1c of the remote starting device 1 of the vehicle control system SY from the key insertion switch 6, that is, the user key insertion signal, is changed to the ON state.

That is, when the user inserts the user key K into the key cylinder KS of the vehicle C, the key insertion switch 6 having detecting the insertion outputs the user key insertion signal to the detection unit 1c of the remote starting device 1.

Accordingly, the remote starting device 1 performs the key operation specifying procedure.

(Time t12)

At time t12, since the authentication device 2 of the vehicle control system SY wirelessly receives the ID signal from the user key K, the authentication device 2 performs the authentication procedure using the user key K. Since the authentication result of the authentication process represents "success", the authentication device 2 transmits the signal representing the authentication result to the remote starting device 1.

(Time t13)

At time t13, the control unit 1b of the remote starting device 1 of the vehicle control system SY changes the second ACC signal to the OFF state to perform the control of turning off the second accessory switch thereof.

That is, when the user's insertion of the user key K into the key cylinder KS is detected after the engine of the vehicle C is remotely started up, the control unit 1b of the remote starting device 1 performs the control of turning off the second accessory switch of the remote starting device 1.

(Time t14)

At time t14, the detection unit 1c of the remote starting device 1 of the vehicle control system SY detects that the first ACC signal is changed from the ON state to the OFF state.

That is, the detection unit 1c of the remote starting device 1 of the vehicle control system SY detects that the electrical connection state of the power supply line L1 is changed from the electrically-connected state to the electrically-disconnected state on the basis of the signal received from the monitor line M1.

(Time t15)

At time t15, the control unit 1b of the remote starting device 1 of the vehicle control system SY changes the second IG signal to the OFF state to perform the control of turning off the second ignition switch of the remote starting device 1.

(Time t16)

At time t16, since the first 1G signal and the second IG signal are in the OFF state, the engine controller 3 of the vehicle control system SY is not supplied with power from the battery B and thus stops the running of the engine.

Therefore, the remote starting device 1 of the vehicle control system SY does not perform the remote starting stopping procedure.

(Time t17)

At time t17, the signal input to the detection unit 1c of the remote starting device 1 of the vehicle control system SY from the foot brake switch 7, that is, the foot brake signal, is changed to the OFF state.

That is, when the user stops the pedaling of the foot brake, the foot brake switch 7 outputs the OFF signal to the detection unit 1c of the remote starting device 1.

<Flow of Control Procedure

Figure 7:
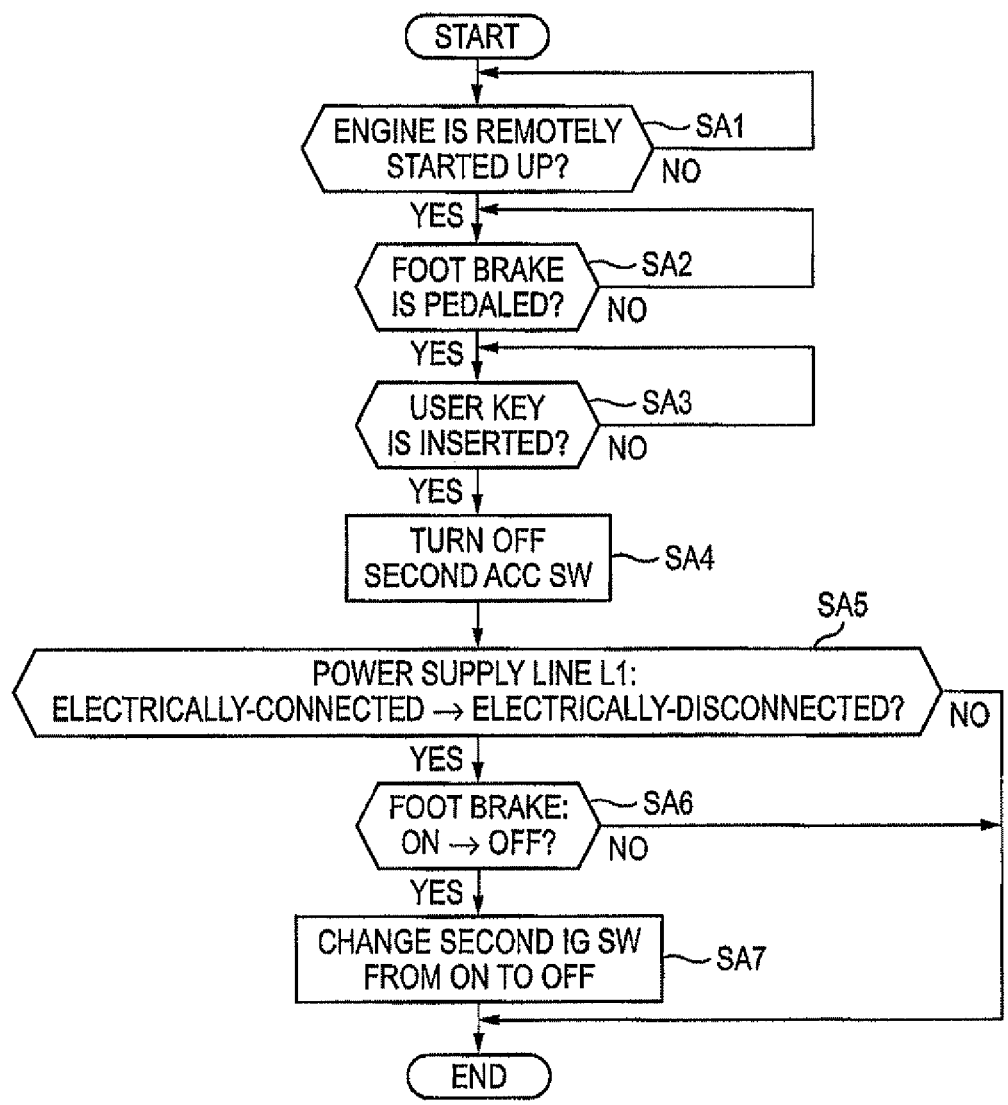
FIG. 7 is a flow diagram illustrating a control procedure of the remote starting device according to the first embodiment.

The key operation specifying procedure will be described in brief with reference to the flow diagram of FIG. 7 illustrating the control procedure. The procedure shown in the flow diagram of FIG. 7 is periodically performed by the vehicle control system SY.

The remote starting device 1 of the vehicle control system SY is supplied with power from the battery B always or periodically so as to receive an RF signal from the remote control terminal RC at any time.

Therefore, the remote starting device 1 periodically performs the process of step SA1 in the flow diagram of FIG. 7.

First, the remote starting device 1 of the vehicle control system SY determines whether the engine of the vehicle C is remotely started up (step SA1). That is, the remote starting device 1 determines whether the engine is started up by receiving the RF signal instructing to start up the engine from the remote control terminal RC.

When it is determined that the engine of the vehicle C is remotely started up (YES in step SA1), the remote starting device 1 performs the process of step SA2. The remote engine starting performed by the remote starting device 1 is embodied by turning on the second accessory switch, the second ignition switch, and the second starter switch.

When it is determined that the engine of the vehicle C is not remotely started up (NO in step SA1), the remote starting device 1 repeats the process of step SA1.

The detection unit 1c of the remote starting device 1 of the vehicle control system SY determines whether the foot brake is pedaled by the user (step SA2). That is, the detection unit 1c of the remote starting device 1 determines whether the ON signal is received from the foot brake switch 7.

When it is determined that the foot brake is pedaled by the user (YES in step SA2), the detection unit 1c of the remote starting device 1 performs the process of step SA3.

When it is determined that the foot brake is not pedaled by the user (NO in step SA2), the detection unit 1c of the remote starting device 1 repeatedly performs the process of SA2.

The remote starting device 1 of the vehicle control system SY determines whether the user key K is inserted into the key cylinder KS (step SA3). The remote starting device 1 determines whether the user key K is inserted into the key cylinder KS on the basis of the signal received from the key insertion switch 6.

When it is determined that the user key K is inserted into the key cylinder KS (YES in step SA3), the remote starting device 1 performs the process of step SA4.

When it is determined that the user key K is not inserted into the key cylinder KS (NO in step SA3), the remote starting device 1 repeatedly performs the process of step SA3.

The control unit 1b of the remote starting device 1 of the vehicle control system SY performs the control of turning off the second accessory switch thereof (step SA4). That is the remote starting device 1 changes the second accessory switch thereof from the ON state to the OFF state.

The detection unit 1c of the remote starting device 1 of the vehicle control system SY determines whether the electrical connection state of the power supply line L1 is changed from the electrically-connected state to the electrically-disconnected state on the basis of the signal received from the monitor line M1 (step SA5).

When it is determined on the basis of the signal received from the monitor line M1 that the electrical connection state of the power supply line L1 is changed from the electrically-connected state to the electrically-disconnected state (YES in step SA5), the detection unit 1c of the remote starting device 1 performs the process of step SA6.

When it is determined on the basis of the signal received from the monitor line M1 that the electrical connection state of the power supply line L1 is not changed from the electrically-connected state to the electrically-disconnected state (NO in step SA5), the detection unit 1c of the remote starting device 1 ends the procedure.

The detection unit 1c of the remote starting device 1 of the vehicle control system SY determines whether the foot brake is changed from the pedaled state to the non-pedaled state by the user (step SA6).

When it is determined that the foot brake is changed from the pedaled state to the non-pedaled state by the user (YES in step SA6), the detection unit 1c of the remote starting device 1 performs the process of step SA7.

When it is determined that the foot brake is not changed from the pedaled state to the non-pedaled state by the user (NO in step SA6), the detection unit 1c of the remote starting device 1 ends the procedure.

That is, the remote starting device 1 estimates that the user ends the operation of the user key K, when the foot brake is changed from the pedaled state to the non-pedaled state by the user.

The control unit 1b of the remote starting device 1 of the vehicle control system SY changes the second ignition switch from the ON state to the OFF state (step SA7). That is, the control unit 1b of the remote starting device 1 turns off the second ignition switch to stop the running of the engine of the vehicle C.

That is, the control unit 1b of the remote starting device 1 turns off the second ignition switch to stop the running of the engine of the vehicle C.

As described above, when the user key K is inserted in the state where the engine of the vehicle C is remotely started up, the remote starting device 1 of the vehicle control system SY performs the control of turning off the second accessory switch and detects that the electrical connection state of the power supply line L1, which connects the battery B to the electrical device controlling the accessories, is changed from the electrically-connected state to the electrically-disconnected state. Then, the remote starting device 1 detects that the foot brake is changed from the pedaled state to the non-pedaled state. The remote starting device 1 performs the control of turning off the second ignition switch connected in parallel to the first ignition switch disposed in the power supply line L2 connecting the battery B to the electrical device controlling the non-accessories.

Accordingly, the remote starting device 1 of the vehicle control system SY can specify that the first ignition switch of the vehicle is turned off by the user's insertion of the user key K.

The remote starting device 1 turns off the second ignition switch connected in parallel to the first ignition switch to stop the running of the engine of the vehicle C by the user's turning-off of the first ignition switch of the vehicle C.

When it is detected that the foot brake is not changed from the pedaled data to the non-pedaled state by the user, the remote starting device 1 does not turn off the second ignition switch to stop the running of the engine of the vehicle C. Accordingly, the user can select one of stopping the running of the engine of the vehicle C and continuing to run the engine until stopping the pedaling of the foot brake after pedaling the foot brake.

Second Embodiment

A second embodiment of the invention will be described below. In the second embodiment, the differences from the flow diagram of FIG. 7 illustrating the control procedure of the first embodiment will be described with reference to FIG. 8.

Figure 8:
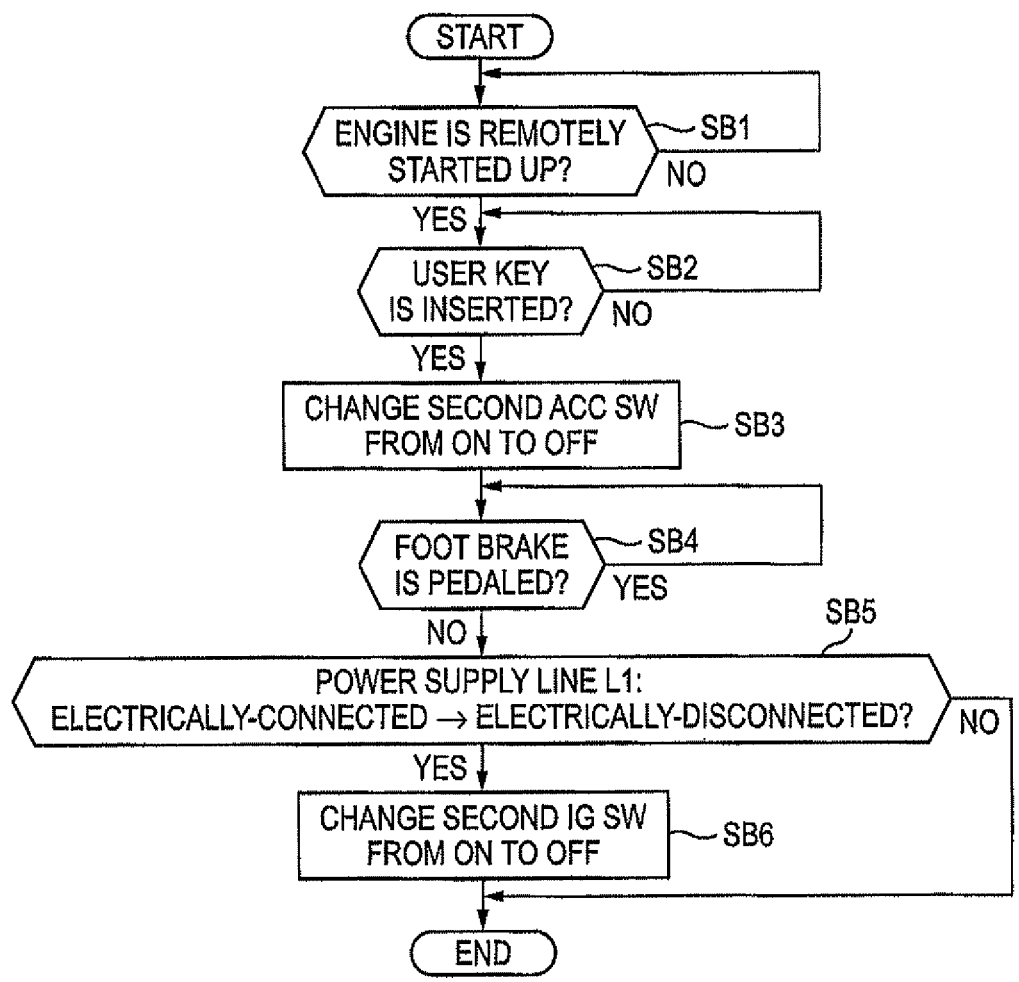
FIG. 8 is a flow diagram illustrating a control procedure of a remote starting device according to a second embodiment of the present invention.

The processes of the flow diagram shown in FIG. 8 are periodically performed by the vehicle control system SY. The remote starting device 1 of the vehicle control system SY is supplied with power from the battery B always or periodically so as to receive an RF signal from the remote control terminal RC at any time.

Therefore, the remote starting device 1 periodically performs the process of step SB1 in the flow diagram of FIG. 8.

First, the remote starting device 1 of the vehicle control system SY determines whether the engine of the vehicle C is remotely started up (step SB1).

When it is determined that the engine of the vehicle C is remotely started up (YES in step SB1), the remote starting device 1 performs the process of step SB2. The remote engine starting performed by the remote starting device 1 is embodied by turning on the second accessory switch, the second ignition switch, and the second starter switch.

When it is determined that the engine of the vehicle C is not remotely started up (NO in step SB1), the remote starting device 1 repeats the process of step SB1.

The remote starting device 1 of the vehicle control system SY determines whether the user key K is inserted into the key cylinder KS (step SB2).

When it is determined that the user key K is inserted into the key cylinder KS (YES in step SB2), the remote starting device 1 performs the process of step SB3.

When it is determined that the user key K is not inserted into the key cylinder KS (NO in step SB2), the remote starting device 1 repeatedly performs the process of step SB2.

The control unit 1b of the remote starting device 1 of the vehicle control system SY performs the control of turning off the second accessory switch thereof (step SB3).

The detection unit 1e of the remote starting device 1 of the vehicle control system SY determines whether the foot brake is pedaled by the user (step SB4).

When it is determined that the foot brake is not pedaled by the user (NO in step SB4), the detection unit 1c of the remote starting device 1 performs the process of step SB5.

When it is determined that the foot brake is pedaled by the user (YES in step SB4), the detection unit 1c of the remote starting device 1 repeatedly performs the process of SB4.

That is, the remote starting device 1 estimates that the user ends the operation of the user key K, when the foot brake is changed from the pedaled data to the non-pedaled state by the user.

The detection unit 1c of the remote starting device 1 of the vehicle control system SY determines whether the electrical connection state of the power supply line L1 is changed from the electrically-connected state to the electrically-disconnected state on the basis of the signal received from the monitor line M1 (step SB5).

When it is determined on the basis of the signal received from the monitor line M1 that the electrical connection state of the power supply line L1 is changed from the electrically-connected state to the electrically-disconnected state (YES in step SB5), the detection unit 1c of the remote starting device 1 performs the process of step SB6.

When it is determined on the basis of the signal received from the monitor line M1 that the electrical connection state of the power supply line L1 is not changed from the electrically-connected state to the electrically-disconnected state (NO in step SB5), the detection unit 1c of the remote starting device 1 repeatedly performs the process of step SB5.

The control unit 1b of the remote starting device 1 of the vehicle control system SY changes the second ignition switch from the ON state to the OFF state (step SB6).

As described above, when the user key K is inserted in the state where the engine of the vehicle C is remotely started up, the remote starting device 1 of the vehicle control system SY performs the control of turning off the second accessory switch and detects that the electrical connection state of the power supply line L1, which connects the battery B to the electrical device controlling the accessories, is changed from the electrically-connected state to the electrically-disconnected state. The remote starting device 1 performs the control of turning off the second ignition switch connected in parallel to the first ignition switch disposed in the power supply line L2 connecting the battery B to the electrical device controlling the non-accessories.

Accordingly, the remote starting device 1 of the vehicle control system SY can specify that the first ignition switch of the vehicle C is turned off by the user's insertion of the user key K.

The remote starting device 1 turns off the second ignition switch connected in parallel to the first ignition switch to stop the running of the engine of the vehicle C by the user's turning-off of the first ignition switch of the vehicle C.

Third Embodiment

A third embodiment of the invention will be described below. In the third embodiment, the differences from the flow diagram of FIG. 7 illustrating the control procedure of the first embodiment will be described with reference to FIG. 9.

Figure 9:
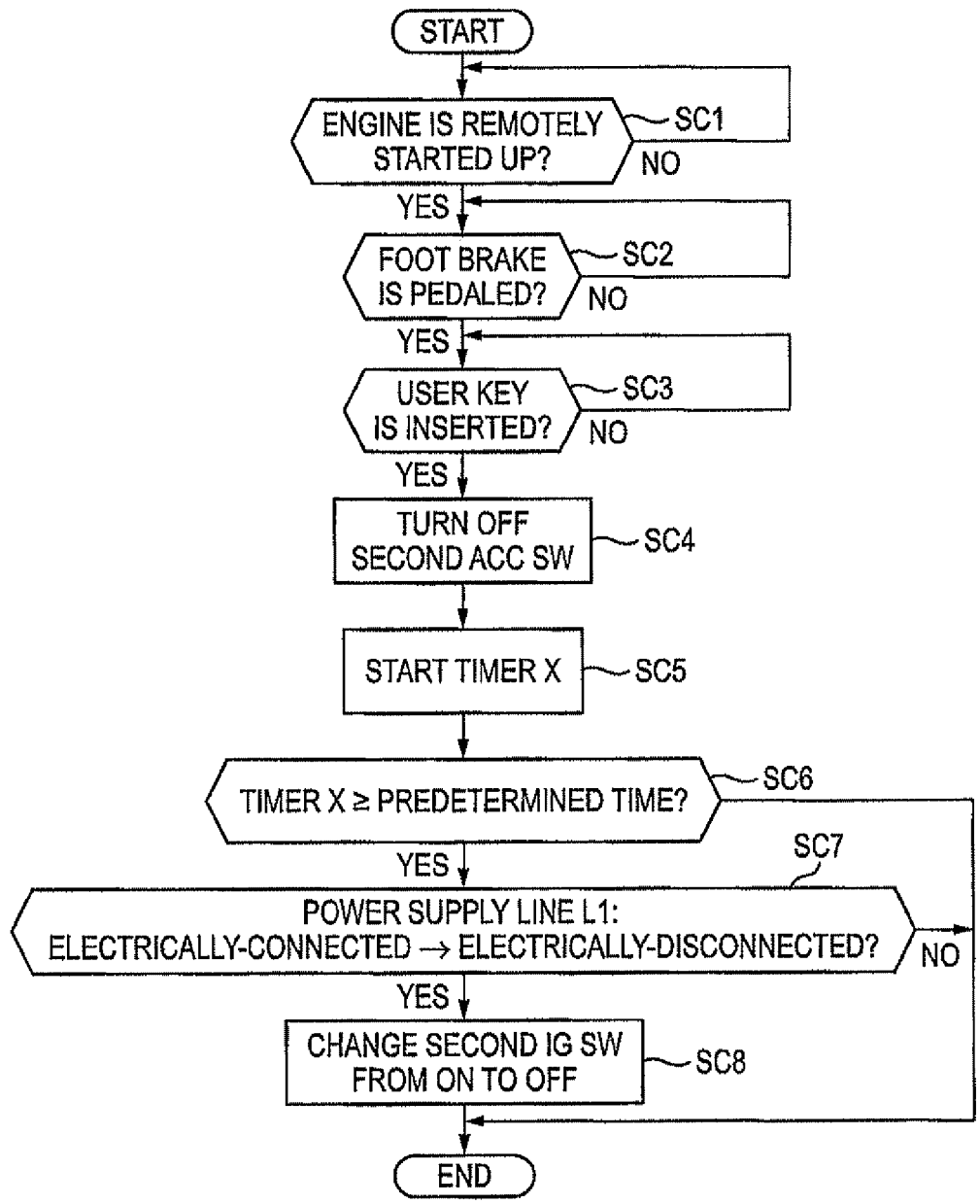
FIG. 9 is a flow diagram illustrating a control procedure of a remote starting device according to a third embodiment of the present invention.

The processes of the flow diagram shown in FIG. 9 are periodically performed by the vehicle control system SY. The remote starting device 1 of the vehicle control system SY is supplied with power from the battery B always or periodically so as to receive an RF signal from the remote control terminal RC at any time.

Therefore, the remote starting device 1 periodically performs the process of step SC1 in the flow diagram of FIG. 9.

First, the remote starting device 1 of the vehicle control system SY determines whether the engine of the vehicle C is remotely started up (step SC1).

When it is determined that the engine of the vehicle C is remotely started up (YES in step SC1), the remote starting device 1 performs the process of step SC2. The remote engine starting performed by the remote starting device 1 is embodied by turning on the second accessory switch, the second ignition switch, and the second starter switch.

When it is determined that the engine of the vehicle C is not remotely started up (NO in step SC1), the remote starting device 1 repeats the process of step SC1.

The detection unit 1c of the remote starting device 1 of the vehicle control system SY determines whether the foot brake is pedaled by the user (step SC2).

When it is determined that the foot brake is pedaled by the user (YES in step SC2), the detection unit 1c of the remote starting device 1 performs the process of step SC3.

When it is determined that the foot brake is not pedaled by the user (NO in step SC2), the detection unit 1e of the remote starting device 1 repeatedly performs the process of SC2.

The remote starting device 1 of the vehicle control system SY determines whether the user key K is inserted into the key cylinder KS (step SC3).

When it is determined that the user key K is inserted into the key cylinder KS (YES in step SC3), the remote starting device 1 performs the process of step SC4.

When it is determined that the user key K is not inserted into the key cylinder KS (NO in step SC3), the remote starting device 1 repeatedly performs the process of step SC3.

The control unit 1b of the remote starting device 1 of the vehicle control system SY performs the control of turning off the second accessory switch thereof (step SC4).

The remote starting device 1 of the vehicle control system SY starts a timer X thereof (step SC5). The remote starting device 1 sets the timer X to 0 when the process of step SC4 is ended.

The remote starting device 1 of the vehicle control system SY determines whether the timer X counts up to a predetermined time (for example, 5 seconds) (step SC6).

When it is determined that the timer X counts up to a predetermined time (YES in step SC6), the remote starting device 1 performs the process of step SC7.

When it is determined that the timer X does not count up to a predetermined time (NO in step SC6), the remote starting device 1 ends the procedure.

The detection unit 1c of the remote starting device 1 of the vehicle control system SY determines whether the electrical connection state of the power supply line L1 is changed from the electrically-connected state to the electrically-disconnected state on the basis of the signal received from the monitor line M1 (step SC7).

When it is determined on the basis of the signal received from the monitor line M1 that the electrical connection state of the power supply line L1 is changed from the electrically-connected state to the electrically-disconnected state (YES in step SC7), the detection unit 1c of the remote starting device 1 performs the process of step SC8.

When it is determined on the basis of the signal received from the monitor line M1 that the electrical connection state of the power supply line L1 is not changed from the electrically-connected state to the electrically-disconnected state (NO in step SC6), the detection unit 1c of the remote starting device 1 ends the procedure.

The control unit 1b of the remote starting device 1 of the vehicle control system SY changes the second ignition switch from the ON state to the OFF state (step SC8).

That is, the control unit 1b of the remote starting device 1 turns off the second ignition switch to stop the running of the engine of the vehicle C.

As described above, when the user key K is inserted in the state where the engine of the vehicle C is remotely started up, the remote starting device 1 of the vehicle control system SY performs the control of turning off the second accessory switch and makes the detection result that the electrical connection state of the power supply line L1, which connects the battery B to the electrical device controlling the accessories, is changed from the electrically-connected state to the electrically-disconnected state valid when a predetermined time elapses after turning off the second accessory switch. The remote starting device 1 performs the control of turning off the second ignition switch connected in parallel to the first ignition switch disposed in the power supply line L2 connecting the battery B to the electrical device controlling the non-accessories.

Accordingly, the remote starting device 1 of the vehicle control system SY can specify that the first ignition switch of the vehicle is turned off by the user's insertion of the user key K.

The remote starting device 1 turns off the second ignition switch connected in parallel to the first ignition switch to stop the running of the engine of the vehicle C by the user's turning-off of the first ignition switch of the vehicle C.

It is possible to improve the usability of the vehicle C by providing a delay time to the user's operation.

Fourth Embodiment

A fourth embodiment of the invention will be described below. In the fourth embodiment, the differences from the flow diagram of FIG. 7 illustrating the control procedure of the first embodiment will be described with reference to FIG. 10.

Figure 10:
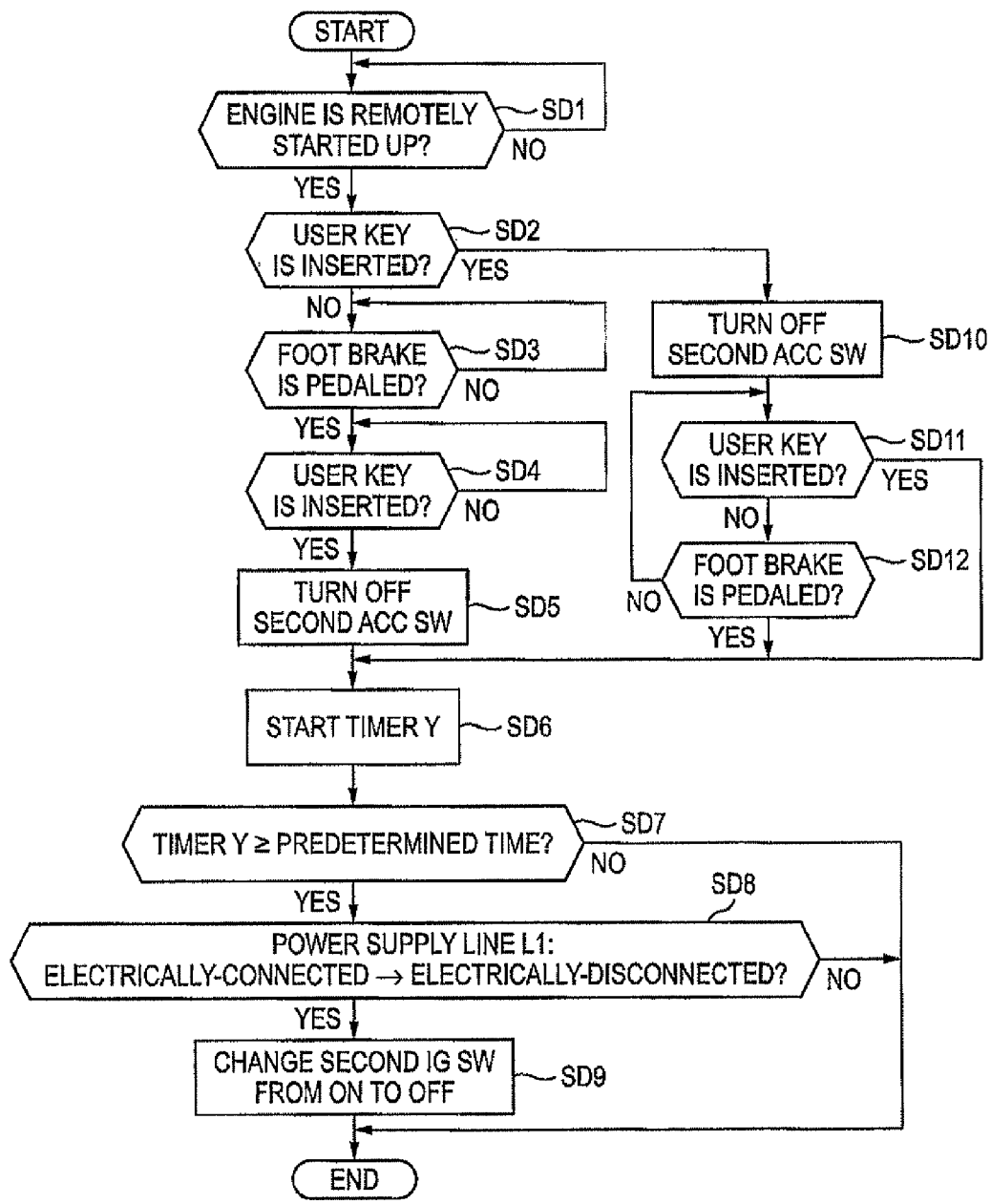
FIG. 10 is a flow diagram illustrating a control procedure of a remote starting device according to a fourth embodiment of the present invention.

The processes of the flow diagram shown in FIG. 10 are periodically performed by the vehicle control system SY. The remote starting device 1 of the vehicle control system SY is supplied with power from the battery B always or periodically so as to receive an RF signal from the remote control terminal RC at any time.

Therefore, the remote starting device 1 periodically performs the process of step SD1 in the flow diagram of FIG. 10.

First, the remote starting device 1 of the vehicle control system SY determines whether the engine of the vehicle C is remotely started up (step SD1).

When it is determined that the engine of the vehicle C is remotely started up (YES in step SD1), the remote starting device 1 performs the process of step SD2. The remote engine starting performed by the remote starting device 1 is embodied by turning on the second accessory switch, the second ignition switch, and the second starter switch.

When it is determined that the engine of the vehicle C is not remotely started up (NO in step SD1), the remote starting device 1 repeats the process of step SD1.

The remote starting device 1 of the vehicle control system SY determines whether the user key K is inserted into the key cylinder KS (step SD2).

When it is determined that the user key K is inserted into the key cylinder KS (YES in step SD2), the remote starting device 1 performs the process of step SD10.

When it is determined that the user key K is not inserted into the key cylinder KS (NO in step SD2), the remote starting device 1 performs the process of step SD3.

The detection unit 1c of the remote starting device 1 of the vehicle control system SY determines whether the foot brake is pedaled by the user (step SD3).

When it is determined that the foot brake is pedaled by the user (YES in step SD3), the detection unit 1c of the remote starting device 1 performs the process of step SD4.

When it is determined that the foot brake is not pedaled by the user (NO in step SD3), the detection unit 1c of the remote starting device 1 repeatedly performs the process of SD3.

The remote starting device 1 of the vehicle control system SY determines whether the user key K is inserted into the key cylinder KS (step SD4).

When it is determined that the user key K is inserted into the key cylinder KS (YES in step SD4), the remote starting device 1 performs the process of step SD5.

When it is determined that the user key K is not inserted into the key cylinder KS (NO in step SD4), the remote starting device 1 repeatedly performs the process of step SD4.

The control unit 1b of the remote starting device 1 of the vehicle control system SY performs the control of turning off the second accessory switch thereof (step SD5).

The remote starting device 1 of the vehicle control system SY starts a timer Y thereof (step SD6). The remote starting device 1 sets the timer Y to 0 when the process of step SD5 is ended.

The remote starting device 1 of the vehicle control system SY determines whether the timer Y counts up to a predetermined time (for example, 5 seconds) (step SD7).

When it is determined that the timer Y counts up to a predetermined time (YES in step SD7), the remote starting device 1 performs the process of step SD8.

When it is determined that the timer Y does not count up to a predetermined time (NO in step SD7), the remote starting device 1 ends the procedure.

The detection unit 1c of the remote starting device 1 of the vehicle control system SY determines whether the electrical connection state of the power supply line L1 is changed from the electrically-connected state to the electrically-disconnected state on the basis of the signal received from the monitor line M1 (step SD8).

When it is determined on the basis of the signal received from the monitor line M1 that the electrical connection state of the power supply line L1 is changed from the electrically-connected state to the electrically-disconnected state (YES in step SD8), the detection unit 1c of the remote starting device 1 performs the process of step SD9.

When it is determined on the basis of the signal received from the monitor line M1 that the electrical connection state of the power supply line L1 is not changed from the electrically-connected state to the electrically-disconnected state (NO in step SD8), the detection unit 1c of the remote starting device 1 ends the procedure.

The control unit 1b of the remote starting device 1 of the vehicle control system SY changes the second ignition switch from the ON state to the OFF state (step SD9).

That is, the control unit 1b of the remote starting device 1 turns off the second ignition switch to stop the running of the engine of the vehicle C.

When the determination result of step SD2 is YES, the remote starting device 1 of the vehicle control system SY performs the control of turning off the second accessory switch thereof (step SD10).

The remote starting device 1 of the vehicle control system SY determines whether the user key K is inserted into the key cylinder KS (step SD11).

When it is determined that the user key K is inserted into the key cylinder KS (YES in step SD11), the remote starting device 1 performs the process of step SD6.

When it is determined that the user key K is not inserted into the key cylinder KS (NO in step SD11), the remote starting device 1 performs the process of step SD12.

The detection unit 1c of the remote starting device 1 of the vehicle control system SY determines whether the foot brake is pedaled by the user (step SD12).

When it is determined that the foot brake is pedaled by the user (YES in step SD12), the detection unit 1c of the remote starting device 1 performs the process of step SD6.

When it is determined that the foot brake is not pedaled by the user (NO in step SD12), the detection unit 1c of the remote starting device 1 performs the process of SD11.

As described above, the remote starting device 1 of the vehicle control system SY according to the first to fourth embodiments validates, after a predetermined time elapses after turning off the second accessory switch, the detection results that the user key K is inserted, the foot brake is pedaled, and the electrical connection state of the power supply line L1, which connects the battery B to the electrical device controlling the accessories, is changed from the electrically-connected state to the electrically-disconnected state in the state where the engine of the vehicle C is remotely started up. The remote starting device 1 performs the control of turning off the second ignition switch connected in parallel to the first ignition switch disposed in the power supply line L2 connecting the battery B to the electrical device controlling the non-accessories.

Accordingly, the remote starting device 1 of the vehicle control system SY can specify that the first ignition switch of the vehicle is turned off by the user's insertion of the user key K.

The remote starting device 1 turns off the second ignition switch connected in parallel to the first ignition switch to stop the running of the engine of the vehicle C by the user's turning-off of the first ignition switch of the vehicle C.

It is possible to improve the usability of the vehicle C by providing a delay time to the user's operation.

Even when the operation of the user key K is performed earlier or later than the brake pedaling operation, the remote starting device 1 can stop the running of the engine of the vehicle C by the user's operation.

Fifth Embodiment

Hereinafter, a remote starting device according to a fifth embodiment of the invention, that is mounted on a vehicle having an automatic transmission and that remotely starts up an engine on the basis of an operation of a remote control terminal will be described.

Figure 11:
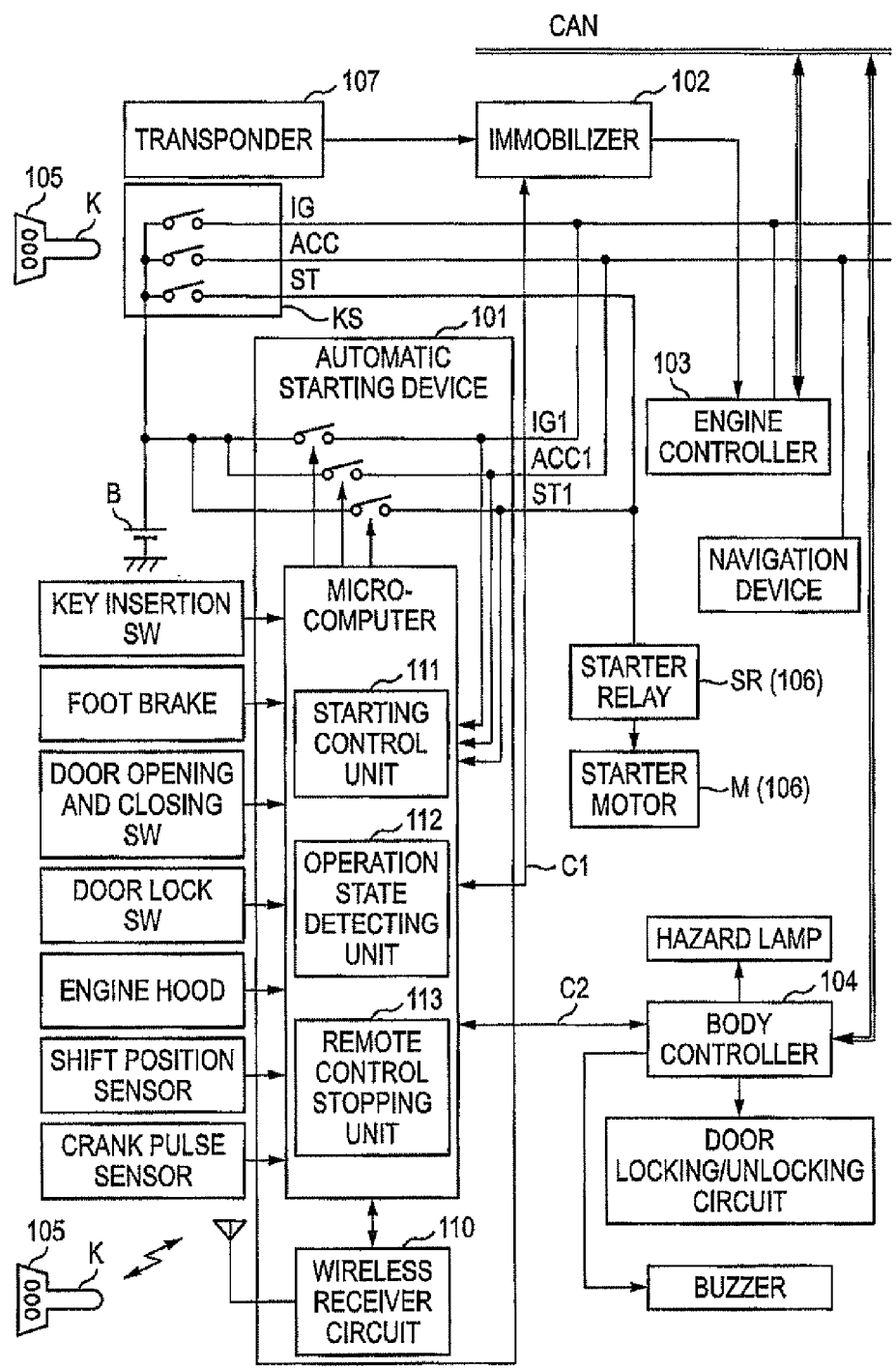
FIG. 11 is a circuit block diagram of a remote starting device according to a fifth embodiment of the present invention.

FIG. 11 shows a primary control system of a vehicle including a remote starting device 101. The vehicle includes electronic controllers such as a remote starting device 101, an immobilizer 102, an engine controller 103, and a body controller 104 and a key cylinder KS controlling switches that supply power to the loads of the vehicle from a battery B.

Each electronic controller includes a microcomputer having a CPU, a ROM storing a control program executed by the CPU, and a RAM storing control data or calculation data. The electronic controllers such as the engine controller 103 and the body controller 104 are connected to each other so as to transmit and receive data via a vehicle network CAN (Controller Area Network).

In the vehicle, when an operator inserts an ignition key (hereinafter, simply referred to as "key") K into the key cylinder KS and turns the key K, an accessory power switch ACC disposed in a power supply path for supplying power to accessory devices from a battery B is turned on, an ignition switch IG disposed in a power supply path for supplying power to ignition devices from the battery B is turned on, and a starter switch ST disposed in a power supply path for supplying power to a starter circuit 106 from the battery B is turned on. The key cylinder KS is provided with a contact circuit so as to turn on the ignition switch IG and to turn off the accessory switch ACC at the time of turning on the starter switch ST.

The accessory devices include loads such as a navigation device, an audio device, and an air cleaner and the ignition devices include loads such as an ignition circuit, an engine controller, and an air conditioner.

The starter circuit 106 includes a starter motor M which cranks the engine and a starter relay SR applying a voltage of the battery B to the starter motor M.

In the fifth embodiment, a key K having an electronic chip storing a specific ID code built in a key head and including a door locking switch, a door unlocking switch, and an engine starting switch is used as a remote control terminal 105.

The immobilizer 102 receives the ID code stored in the electronic chip built in the key K via a transponder 107, electronically verifies the received ID code with a vehicle ID code, and transmits a control signal representing that it is an authentic key to the engine controller 103 when both codes are equal to each other.

The engine controller 103 is connected to a power supply line via the accessory switch ACC and a power supply line via the ignition switch IG and detects states of the switches on the basis of voltages of the power supply lines.

The engine controller 103 starts when the ignition switch 1G is turned on and starts up the engine only when receiving the control signal representing that it is an authentic key from the immobilizer 102. That is, when the starter switch ST is turned on to crank the engine, the engine controller 103 determines a steam cylinder on the basis of a crank pulse output from a crank sensor disposed in a crankshaft, injects fuel to the steam cylinders at a predetermined time, starts up the engine by controlling the ignition, and stops the engine by stopping the fuel injection and the ignition control when the ignition switch IG is turned off.

The body controller 104 controls an automatic door locking and unlocking circuit in response to operations of the door locking switch and the door unlocking switch disposed in the key K and controls the buzzing of a buzzer when an intruder is detected.

The remote starting device 101 includes three relay circuits ACC1, IG1, and ST1 connecting the battery B to the accessory devices, the ignition devices, and the starter circuit, respectively, independently of the switches such as the accessory switch ACC, the ignition switch IG, and the starter switch ST. The output voltages of the relay circuits ACC1, IG1, and ST1 are input as monitoring signals of the relay circuits ACC1, IG1, and ST1 to the remote starting device 101. The relay circuit IG1 serves as the first switch in the invention and the relay circuit ACC1 serves as the second switch in the invention.

As can be seen from FIG. 11, the relay circuits ACC1, IG1, and ST1 are connected in parallel to the accessory switch ACC, the ignition switch IG, and the starter switch ST, respectively, between the battery B and the load circuits.

The voltages of the connecting points between the relay circuits ACC1, IG1, and ST1 and the load circuits are input to an input port of the microcomputer of the remote starting device 101. The input port is used to diagnose failures of the relay circuits ACC1, IG1, and ST1. When the relay circuits ACC1, IG1, and ST1 are turned on and the battery voltage is not detected, it is determined that the relay circuits are broken. When the relay circuits ACC1, IG1, and ST1 are turned off and the battery voltage is detected, it is determined that the relay circuits are short-circuited.

The voltage of the connecting point between the relay circuit ACC1 and the load circuit can also be used to determine whether or not to stop the remotely-started engine. Details thereof will be described later.

The remote starting device 101 includes a wireless receiver circuit 110 that receives remote control signals such as an engine starting signal, a door locking signal, and a door unlocking signal wirelessly transmitted from the remote control terminal 105.

The remote starting device 101, the immobilizer 102, and the body controller 104 are connected to each other via local communication lines C1 and C2. The remote starting device 101 reads an ID code for combination from the immobilizer 102, combines the ID with that of the remote control terminal 105, transmits the combination result to the immobilizer 102, and transmits the door unlocking signal or the door locking signal transmitted from the remote control terminal 105 to the body controller 104 when it is an authentic remote control terminal 105.

Switch signals such as an insertion switch signal of the key K into the key cylinder KS where the insertion switch is disposed in the key cylinder, which is control data necessary for the remote starting control of the engine, a brake pedaling signal, a door opening and closing switch signal, a door locking and unlocking switch signal, an engine hood signal, a shift position switch signal, and an engine rotation rate signal are input to the remote starting device 101.

The remote starting device 101 includes functional blocks such as a starting control unit 111 that starts up the engine when receiving the engine starting signal wirelessly transmitted from the remote control terminal 105, an operation state detecting unit 112 that detects at least the insertion of the key K into the key cylinder KS and the brake pedaling operation by the operator on the basis of the input of the above-mentioned switch signals, and a remote control stopping unit 113 that determines that the ignition switch 1G is turned on by the operation of the key K when the insertion of the key K is detected before or after the brake pedaling operation is detected by the operation state detecting unit 112 after the engine is started up by the starting control unit 111 and that turns off the relay circuits ACC1 and IG1.

The functional blocks are embodied by a control program stored in the ROM and the CPU executing the control program. Other than the three functional blocks described above, a functional block that performs is included, but an explanation of such a functional block is omitted.

The starting control unit 111 receives the ID and the engine starting signal wirelessly transmitted from the remote control terminal 105, transmits a signal representing that it is an authentic ID to the immobilizer 102 when it is authenticated that it is an authentic ID, and turns on the remote-starting relay circuits ACC1, IG1, and ST1.

The engine controller 103 starts up the engine by receiving a signal representing that the engine starting signal has been received from the authentic remote control terminal 105 from the immobilizer 102, identifying the cylinders on the basis of the crank pulse when the cranking of the engine is confirmed, injecting fuel to the cylinders at a predetermined time, and controlling the ignition.

At this time, when a switch of an air conditioner connected to a power supply path via the ignition switch IG is turned on, the air-conditioning of the vehicle interior is simultaneously started.

The starting control unit 111 turns on the relay circuit ST1, then detects the crank pulse which is the engine rotation rate signal, and determines that the starting of the engine is finished when the engine reaches a predetermined rotation rate, and turns off the relay circuit ST1.

Thereafter, the remote control stopping unit 113 continues to perform a warming-up operation for a predetermined time, for example, about 20 minutes, turns off the relay circuits ACC1 and IG1 when the predetermined time passes, and stops the engine. When the engine starting switch built in the remote control terminal 105 is turned on again during the warming-up operation, the engine stopping signal is transmitted. When the engine stopping signal is received, the engine is stopped.

At the time of continuing to perform the warming-up operation for about 20 minutes, the remote control stopping unit 113 performs one of a control procedure of ending the remote starting control operation to enter a driving-enabled state without stopping the engine in the state where the engine is remotely started up and a control procedure of stopping the engine to prevent the theft of the vehicle by a third party on the basis of the operator's operation detected by the operation state detecting unit.

In general, in a vehicle having an automatic transmission, an operator inserts and turns a key, then pedals the brake, and switches the shift lever from the parking range to the driving range to enter a driving-enabled state.

Accordingly, by ending the remote starting control operation to enter the driving-enabled state without stopping the engine only when the key K is inserted into the key cylinder KS and the turning-on of the ignition switch IG due the operation of the key K is detected in the state where the engine is remotely started up, it is possible to improve the convenience to the operator.

However, in order to detect the turning-on of the ignition switch IG due to the operation of the key K, it is necessary to provide a dedicated detector circuit, thereby causing an increase in cost of the vehicle.

An operator may operate the key after pedaling the brake. In this case, when the remote control stopping unit 113 determines that it is an abnormal operation procedure and stops the engine, an authentic operator such as an owner of the vehicle needs to operate the key again to restart the engine.

Therefore, the remote starting device 101 according to the fifth embodiment of the invention can determine the key operation without providing a detector circuit detecting the turning-on of the ignition switch IG due to the operation of the key K and can enter a driving-enabled state without stopping the engine even when the brake pedaling operation is performed before the key operation.

Specifically, when the insertion of the key K is detected by the operation state detecting unit after the engine is started up by the starting control unit, the remote control stopping unit 113 determines whether or not to stop the remote control on the basis of the variation in voltage of the connecting point between the accessory circuit and the relay circuit ACC1 in the state where the relay circuit ACC1 is turned off.

When an increase in voltage from 0 V to the battery voltage is detected, it is determined that the accessory switch ACC is turned on by the turning operation of the key K. When the voltage is changed to 0 V again thereafter, it is determined that the accessory switch ACC is turned off by the turning operation of the key K.

When it is determined that the accessory switch ACC is turned on, it is estimated that the ignition switch 1G is also turned on. When it is determined that the accessory switch ACC is turned off, it is determined that the ignition switch 1G is also turned off.

As a result, when it is determined that the ignition switch IG is turned on by the operation of the key K, the relay circuit ACC1 is turned off to stop the remote starting control. At this time, since the ignition switch IG is turned on already, it is possible to enter a driving-enabled state without stopping the engine.

Figure 12:
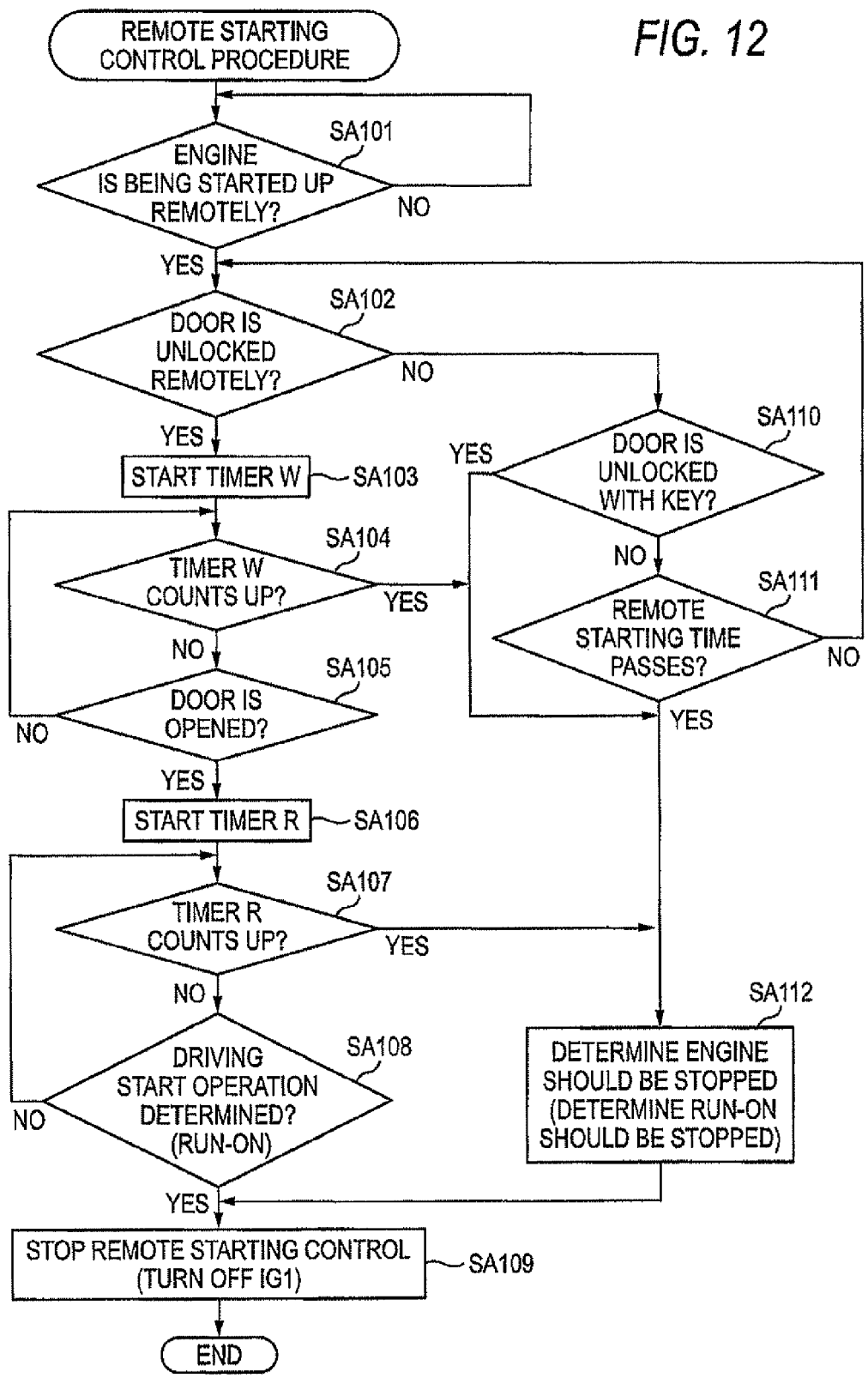
FIG. 12 is a flow diagram illustrating a control procedure of the remote starting device according to the fifth embodiment.

Details thereof will be described below. As shown in FIG. 12, when the operation state detecting unit 112 detects that a door is unlocked by the remote control terminal 105 (SA102) in the state (SA101) where the engine is remotely started up by the starting control unit 111 having received the engine starting signal from the remote control terminal 105, the remote control stopping unit 113 determines that it is an authentic operator and starts a timer W (SA103).

The timer W is a timer defining a delay time until a subsequent operation, that is, the opening or closing of a door, is detected and is used to forcibly stop the engine for the purpose of prevention of theft when the opening or closing of a door is not detected within the delay time. The value of the timer is set to, for example, about 10 seconds, but is not limited thereto.

When the timer W counts up (SA104), the remote control stopping unit 113 determines whether to stop the engine (SA112) and stops the remote starting control procedure, that is, bans a run-on operation enabling driving in the remotely-started state of the engine to turn off the relay circuit 101 at once. Accordingly, the engine is stopped (SA109).

When the operation state detecting unit 112 detects that the door of a driver's seat is opened (SA105) until the timer W counts up (SA104), the remote control stopping unit 113 starts a timer R (SA106).

The timer R is a timer defining a delay time until the operator boards the vehicle and performs a driving start operation such as the insertion of the key K and the brake pedaling operation, and is used to forcibly stop the engine for the purpose of prevention of theft when the driving start operation is not detected within the delay time. The value of the timer is set to, for example, about 10 seconds, but is not limited thereto.

When the timer R counts up (SA107), the remote control stopping unit 113 determines whether to stop the engine (SA112) and stops the remote starting control procedure, that is, turns off the relay circuit 101. Accordingly, the engine is stopped (SA109).

When the operation state detecting unit 112 detects the driving start operation (which is an operation for starting the driving such as operating the key K and operating the brake and is also referred to as "run-on operation") (SA108) until the timer R counts up (SA107), the remote control stopping unit 113 determines that the ignition switch IG is turned on by the key K to enter the driving-enabled state, and stops the remote starting control procedure, that is, turns off the relay circuit 101 (SA109). At this time, since the ignition switch IG is turned on, it is possible to enter the driving-enabled state without stopping the engine.

When the operation state detecting unit 112 detects that the door is not unlocked by the remote control terminal 105 but by the key K in step SA102 (SA110), the engine stop determining procedure of step SA112 is performed at once. When the remote operation is performed by the door unlocking switch of the key K, it is determined that it is an authentic operator and the labor of restarting the engine is saved to increase convenience. When the door is unlocked by the manual operation of the key K, not by the remote operation, it is determined that it is not an authentic operator and the engine is stopped to enhance security.

The determination process of step SA102 is not necessary and the determination process of step SA110 instead of step SA102 may be performed at the position of step SA102.

Figure 13:
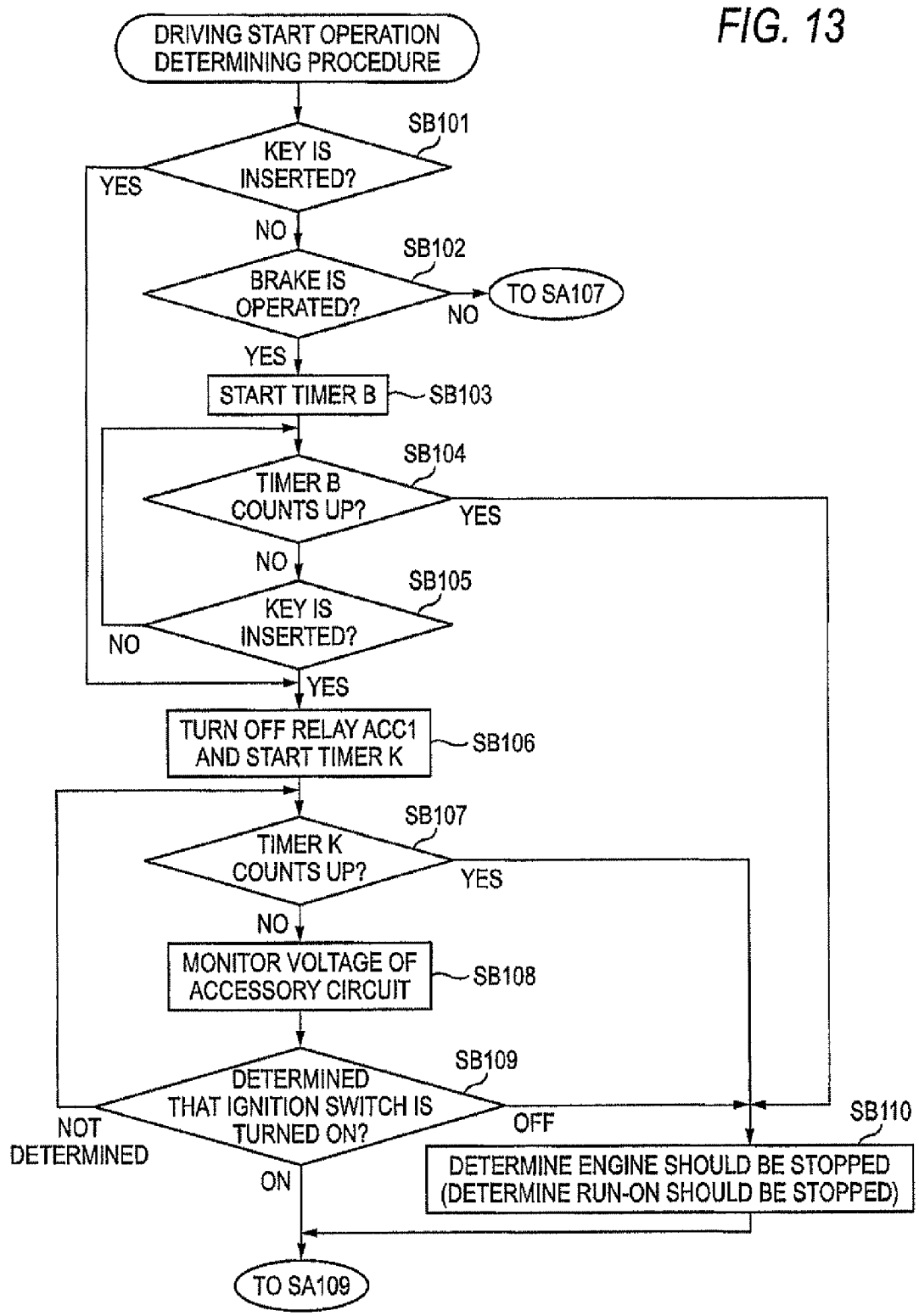
FIG. 13 is a flow diagram illustrating a driving start operation determining procedure of the remote starting device according to the fifth embodiment.

FIG. 13 shows the details of the driving start operation determining procedure of step SA108. When the brake pedaling operation is detected (SB102) until the operation state detecting unit 112 detects that the key K is inserted into the key cylinder KS by the operator (SB101), the remote control stopping unit 113 starts a timer B (SB103).

The timer B is a timer defining a delay time until the operator inserts the key K, and is used to forcibly stop the engine for the purpose of prevention of theft when the key K is not inserted into the key cylinder KS within the delay time. The value of the timer is set to, for example, about 3 seconds, but is not limited thereto.

When the timer B counts up (SB104), the remote control stopping unit 113 determines whether to stop the engine (SB110) and stops the remote starting control procedure, that is, turns off the relay circuit 101 in step SA109. Accordingly, the engine is stopped.

When the insertion of the key K is detected by the operation state detecting unit 112 (SB105) until the timer B counts up (SB104), the remote control stopping unit 113 turns off the relay circuit ACC1 and starts a timer K (SB106). That is, second switch control means for controlling the ON or OFF state of the second switch is constituted by the starting control unit 111 turning on the second switch and the remote control stopping unit 113 turning off the second switch.

The timer K is a timer defining a delay time until the ignition switch IG is turned on after the operator inserts the key K and is used to determine that the ignition switch IG is turned on in the delay time. The value of the timer is set to, for example, about 5 seconds, but is not limited thereto.

Until the timer K counts up (SB107), the voltage applied to the accessory circuit in the back of the relay circuit ACC1 is monitored by the operation state detecting unit 112 (SB108).

In step SB109, it is determined whether the ignition switch is turned on. In step SB108, the monitored voltage is checked at intervals of several msecs for 5 seconds when the timer K counts up and the process of step SB107 is repeated until the determination is made.

In the meantime, when the monitored voltage is kept at 0 V for a predetermined time of, for example, 2 seconds, it is determined that the key K is not operated. When the monitored voltage increases up to the battery voltage in the meantime and the increased voltage is kept for a predetermined of, for example, 2 seconds, it is estimated that the ignition switch IG is turned on. When the monitored voltage decreases up to 0 V in the meantime, it is determined that the ignition switch IG and the accessory switch ACC are turned off by the operation of the key K after the ignition switch IG is turned on once.

When it is determined that the ignition switch IG is turned on, the remote starting control is stopped, that is, the relay circuit IG1 is turned off, in step SA109. At this time, since the ignition switch IG is turned on already, it is possible to enter the driving-enabled state without stopping the engine.

When it is determined that the ignition switch IG is turned off, it is determined that the engine should be stopped (SB110) and the relay circuit IG1 is turned off in step SA109. In this state, since the ignition switch IG is turned off, the engine is stopped.

Figure 14:
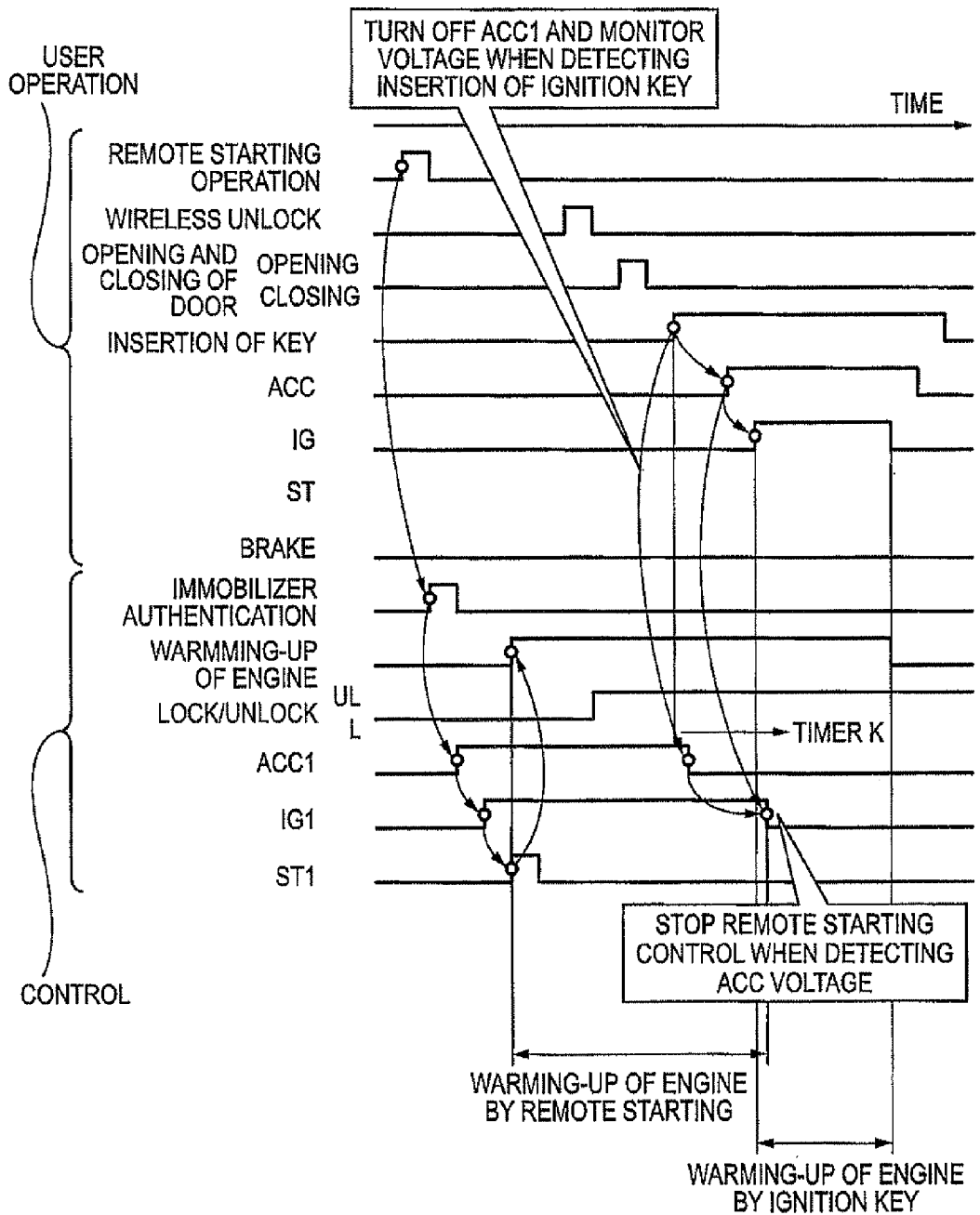
FIG. 14 is a timing diagram illustrating the driving start operation determining procedure of the remote starting device according to the fifth embodiment.

FIG. 14 shows an example where the insertion of the key is performed earlier than the brake pedaling operation and is a timing diagram illustrating the states where the operator's insertion of the key K is detected by the operation state detecting unit 112, the relay circuit ACC1 is turned off, the voltage applied to the accessories is monitored by the operation state detecting unit 112, it is determined the accessory switch ACC is turned on as a result, and the remote starting control is stopped.

Figure 15:
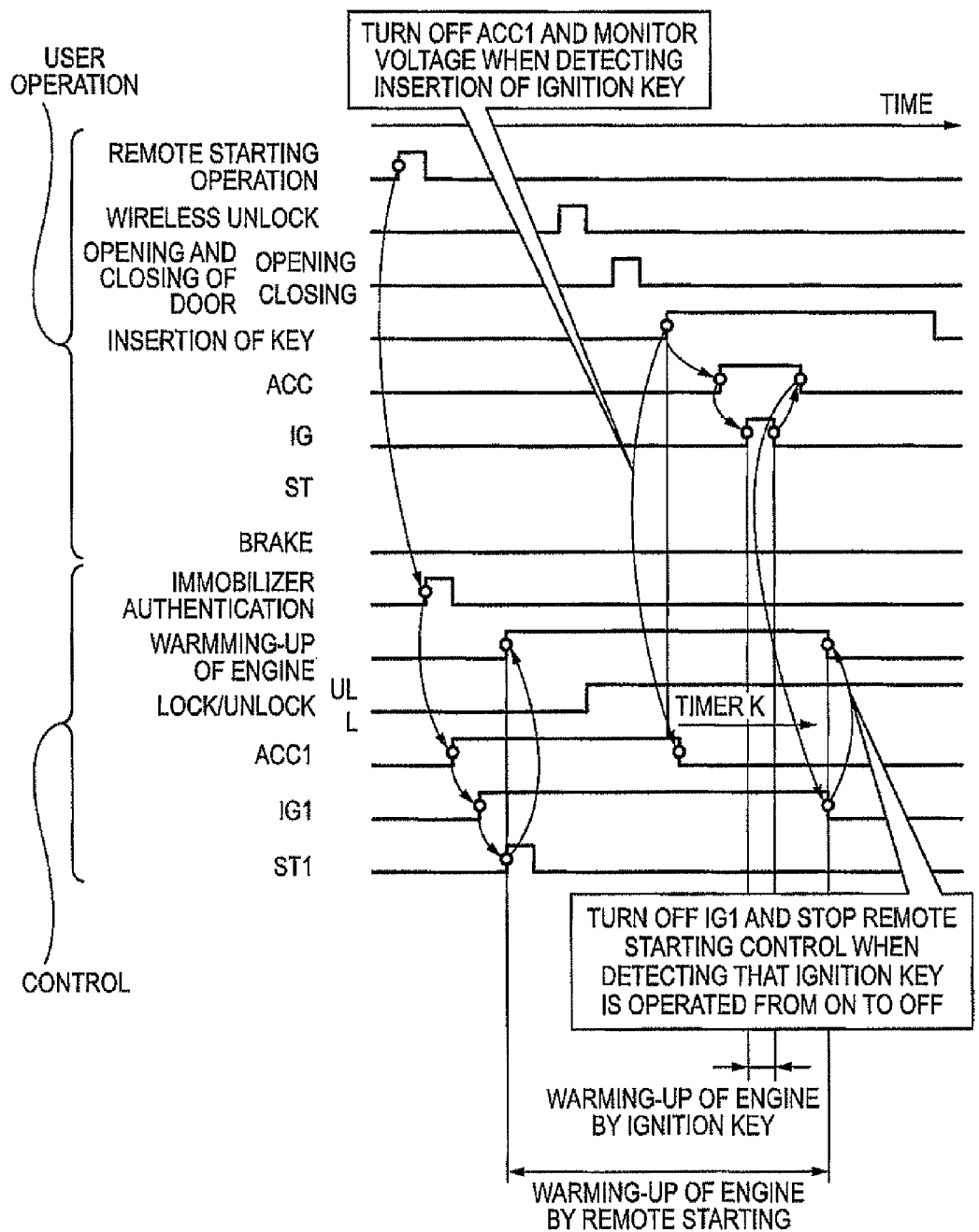
FIG. 15 is a timing diagram illustrating the driving start operation determining procedure of the remote starting device according to the fifth embodiment.

FIG. 15 shows an example where the insertion of the key is performed earlier than the brake pedaling operation and is a timing diagram illustrating the states where the operator's insertion of the key K is detected by the operation state detecting unit 112, the relay circuit ACC1 is turned off, the key is reversely turned by the operator to turn off the ignition switch IG while the voltage applied to the accessories is being monitored by the operation state detecting unit 112 (while the timer K is counting up), and the remote starting control is stopped.

Figure 16:
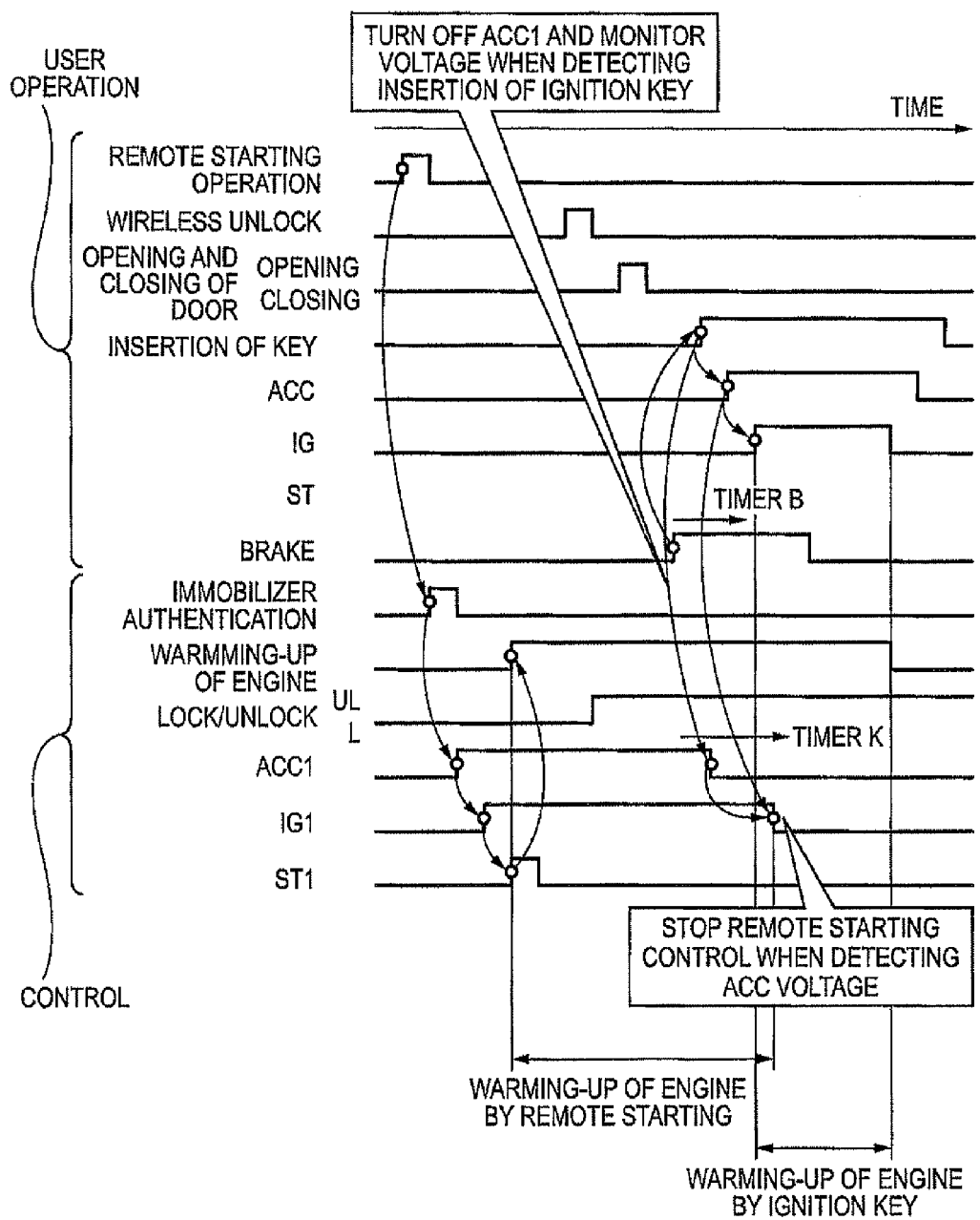
FIG. 16 is a timing diagram illustrating the driving start operation determining procedure of the remote starting device according to the fifth embodiment.

FIG. 16 shows an example where the insertion of the key is performed later than the brake pedaling operation and is a timing diagram illustrating the states where the operator's insertion of the key K is detected by the operation state detecting unit 112, the relay circuit ACC1 is turned off, the voltage applied to the accessories is monitored by the operation state detecting unit 112, it is determined that the accessory switch ACC is turned on as a result, and the remote starting control is stopped.

Figure 17:
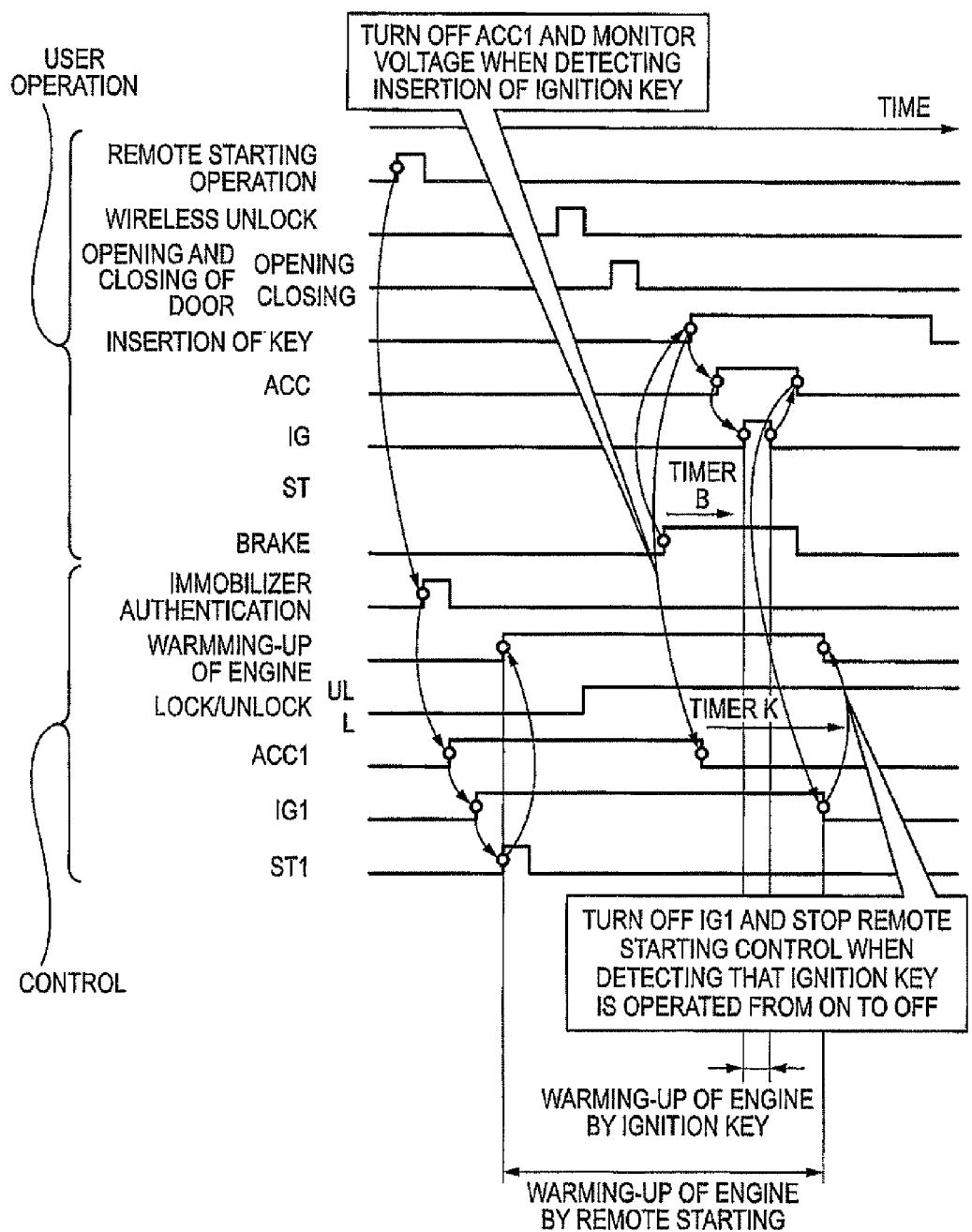
FIG. 17 is a timing diagram illustrating the driving start operation determining procedure of the remote starting device according to the fifth embodiment.

FIG. 17 shows an example where the insertion of the key is performed later than the brake pedaling operation and is a timing diagram illustrating the states where the operator's insertion of the key K is detected by the operation state detecting unit 112, the relay circuit ACC1 is turned off, the key is reversely turned by the operator to turn off the ignition switch IG while the voltage applied to the accessories is being monitored by the operation state detecting unit 112 (while the timer K is counting up), and the remote starting control is stopped.

Other embodiments of the invention will be described below.

In the fifth embodiment, the relay circuit ACC1 is turned off when it is determined in step SB105 whether the key K is inserted. However, the time of turning off the relay circuit ACC1 may not be when it is determined that the key K is inserted, and the second switch may be turned off when the operator's operation of boarding the vehicle is detected by the operation state detecting unit. The operator's operation of boarding the vehicle includes an operation of unlocking a door, an operation of opening the door, an operation of detecting the operator's boarding by the use of a sensor disposed in the driver seat, and an operation of closing the door.

The OFF state of the relay circuit ACC1 may be kept from the time of remotely starting up the engine. When the load connected to the accessory circuit is a load which is not necessary for the state where the operator is not in the vehicle, such as a navigation system or an audio system, it is not necessary to turn on the relay circuit ACC1.

However, when the load connected to the accessory circuit is a load necessary for the state where the operator is not in the vehicle, such as an air cleaner, it is preferable that the relay circuit ACC1 is turned on at the time of starting up the engine.

Therefore, it is preferable that the starting control unit includes a setting unit which can select whether the relay circuit ACC1 should be turned on when the relay circuit 101 is turned on and the engine is started up. For example, the remote starting device may include a detector that detects the types of the vehicle-mounted loads and a RAM that stores the vehicle-mounted loads detected by the detector as the setting unit. For example, when a load which preferably works in the state where the operator is not in the vehicle, such as an air cleaner, is mounted on the vehicle, the starting control unit can select whether the relay circuit ACC1 should be turned on at the same time, on the basis of the types of the vehicle-mounted loads stored in the RAM, The configuration of the detector is not particularly limited, and may be configured to introduce accessory information via the CAN.

The information for selecting whether the relay circuit ACC1 is turned on at the same time may be wirelessly transmitted from the remote control terminal 105. It is possible to select whether the selection information should be transmitted depending on an operation order of plural keys set in the remote control terminal 105. For example, when the engine starting switch is operated and then the door lock switch is operated, an engine starting signal representing that the relay circuit ACC1 should be turned on at the same time may be transmitted. When the engine starting switch is operated and then the door unlocking switch is operated, the engine starting signal representing that the relay circuit IG1 should be turned on in the state where the relay circuit ACC1 is turned off may be transmitted.

In the fifth embodiment, it has been described that the remote starting device 101 is provided with three relay circuits ACC1, IG1, and ST1 connecting the battery B to the accessory device, the ignition device, and the starter circuit, respectively, independently of the switches of the accessory switch ACC, the ignition switch IG, and the starter switch ST and the output voltages of the relay circuits ACC1, IG1, and ST1 are input as the monitored signals of the relay circuits ACC1, IG1, and ST1. However, the relay circuit ACC1 may not necessarily be provided.

Figure 18:
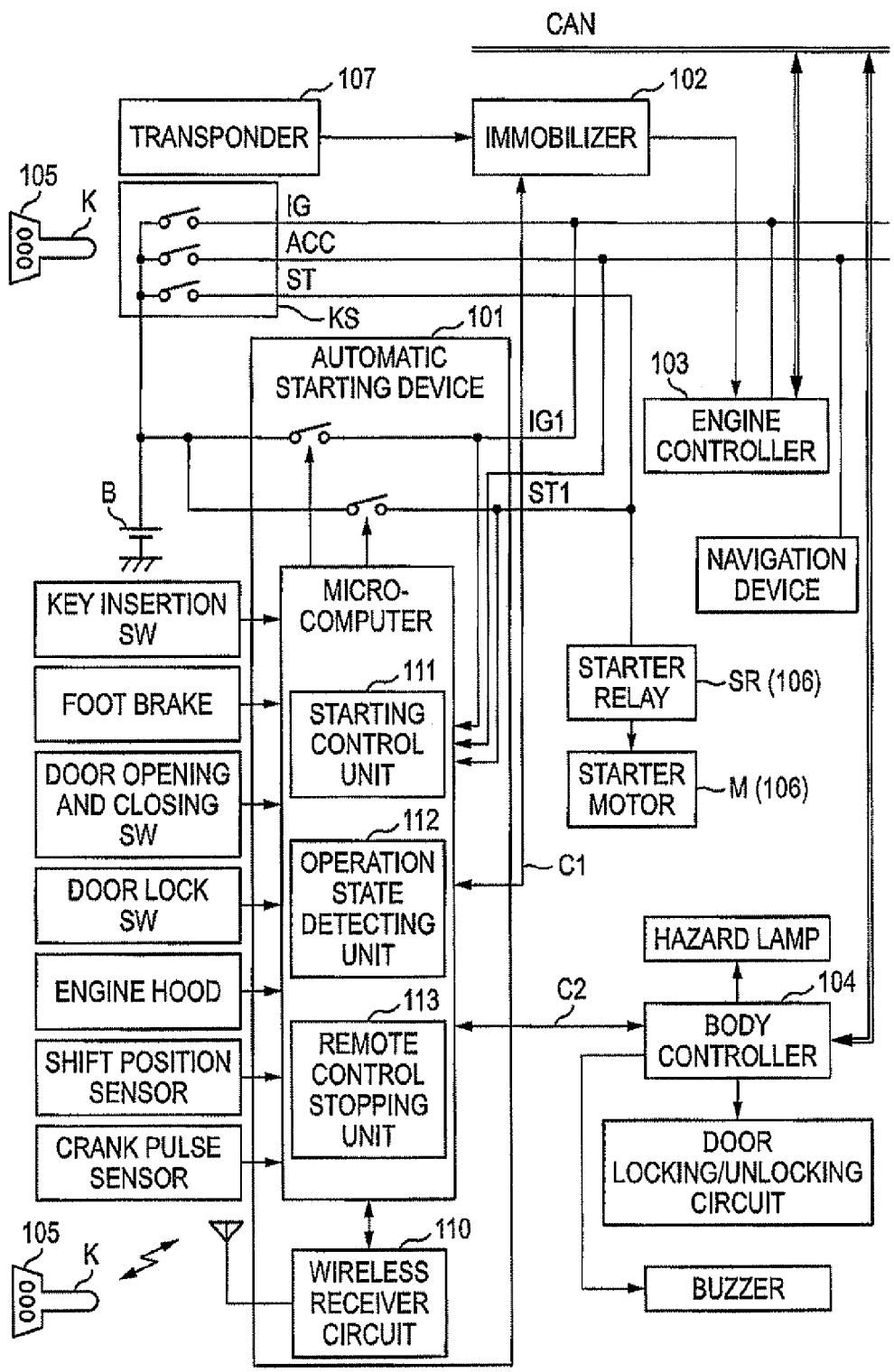
FIG. 18 is a circuit block diagram of a remote starting device according to another embodiment of the present invention.

As shown in FIG. 18, in this case, by inserting a signal terminal used to monitor the voltage of the power supply path from the battery B to the accessory device which is inserted into the remote starting device 101, it is possible to monitor the operation state of the accessory switch ACC.

That is, the remote starting device according to the invention includes: the starting control unit that includes a first switch connected in parallel to the ignition switch disposed in a path connecting the battery to the ignition device and that turns on at least the first switch to start up the engine when receiving the engine starting signal; the operation state detecting unit that detects the operator's insertion of the key into the key cylinder; and the remote control stopping unit that turns off the first switch when the insertion of the key into the key cylinder is detected by the operation state detecting unit and it is detected that the electrical connection state of the path connecting the battery to the accessory device is changed from the electrically-disconnected state to the electrically-connected state after the engine is started up by the starting control unit.

The fifth embodiment and the other embodiments described above are examples of the invention. The specific configurations of the functional blocks, the settings of the timer values, and the like can be appropriately changed in design depending on remote starting devices to be employed without departing from the scope in which the operational advantages of the invention can be obtained.

What is claimed is:

1. A remote starting device that starts up an engine when receiving an RF signal instructing to start up the engine from a remote control terminal, the remote starting device comprising:
    a first switch provided in parallel to an accessory switch which is disposed in a first power supply line connecting a battery to an electrical device for controlling accessories;
    a second switch provided in parallel to an ignition switch which is disposed in a second power supply line connecting the battery to an electrical device for controlling non-accessories;
    a first controller that controls the second switch to be turned on when starting up the engine;
    a first detector that detects an insertion state of a key into a key cylinder by a user;
    a second detector that detects an electrical connection state in the first power supply line;
    a second controller that controls the first switch to be turned off when the first detector detects that the key is inserted in, a state where the engine is started up; and
    a third controller that controls the second switch to be turned off when the second detector detects that the electrical connection state of the first power supply line is changed from an electrically-connected state to an electrically-disconnected state in a state where the first switch is turned off by the second controller.

2. The remote starting device as set forth in claim 1, wherein the third controller controls the second switch to be turned off when the second detector detects that the electrical connection state of the first power supply line is changed from the electrically-connected state to the electrically-disconnected state and the electrically-disconnected state is kept for a predetermined time or more in the state where the first switch is turned off by the second controller.

3. A remote starting method for starting up an engine when receiving an RF signal instructing to start up the engine from a remote control terminal, the remote starting method comprising:
    (a) detecting an insertion state of a key into a key cylinder by a user;
    (b) controlling a first switch, which is provided in parallel to an accessory switch which is disposed in a first power supply line connecting a battery to an electrical device for controlling accessories, to be turned off when it is detected in the step of (a) that the key is inserted in a state where the engine is started up;
    (c) controlling a second switch, which is provided in parallel to an ignition switch which is disposed in a second power supply line connecting the battery to an electrical device controlling non-accessories, to be turned on when starting up the engine;
    (d) detecting an electrical connection state in the first power supply line; and
    (e) controlling the second switch to be turned off when it is detected in the step of (d) that the electrical connection state in the first power supply line is changed from an electrically-connected state to an electrically-disconnected state in a state where the first switch is turned off in the step of (b).

4. The remote starting method as set forth in claim 3, wherein the step of (e) includes controlling the second switch to be turned off when it is detected in the step of (d) that the electrical connection state in the first power supply line is changed from the electrically-connected state to the electrically-disconnected state and the electrically-disconnected state is kept for a predetermined time or more in the state where the first switch is turned off in the step of (b).

5. A remote starting device that starts up an engine of a vehicle when receiving an engine starting signal wirelessly transmitted from a remote control terminal, the remote starting device comprising:
    a starting control unit that turns on at least a first switch which is provided in parallel to an ignition switch which is disposed in a path connecting a battery to an ignition device so as to start up the engine when receiving the engine starting signal;
    an operation state detecting unit that detects a key insertion operation of inserting a key into a key cylinder by an operator; and a remote control stopping unit that turns off the first switch when the operation state detecting unit detects that the key is inserted into the key cylinder and it is detected that an electrical connection state of a path connecting the battery to an accessory device is changed from an electrically-disconnected state to an electrically-connected state after the engine is started up by the starting control unit.

6. The remote starting device as set forth in claim 5, further comprising a second switch controller that controls an ON/OFF state of a second switch which is provided in parallel to an accessory switch which is disposed in the path connecting the battery to the accessory device, wherein the operation state detecting unit detects that the electrical connection state of the path connecting the battery to the accessory device is changed from the electrically-disconnected state to the electrically-connected state on the basis of a variation in voltage of a connection point between the accessory device and the second switch when the second switch is controlled to be turned off by the second switch controller.

7. The remote starting device as set forth in claim 6, wherein when the starting control unit receives the engine starting signal, the second switch controller controls the second switch to be turned on, and wherein when the operation state detecting unit detects that the key is inserted into the key cylinder, the second switch controller controls the second switch to be turned off and then the remote control stopping unit detects the variation in voltage.

8. The remote starting device as set forth in claim 6, wherein when the starting control unit receives the engine starting signal, the second switch controller controls the second switch to be turned on, and wherein when the operation state detecting unit detects an operator's operation of boarding the vehicle, the second switch controller controls the second switch to be turned off and then the remote control stopping unit detects the variation in voltage.

9. The remote starting device as set forth in claim 6, further comprising a setting unit that selects whether the second switch is to be turned on when the starting control unit turns on the first switch so as to start up the engine.

10. The remote starting device as set forth in claim 9, wherein selection information to be set in the setting unit is wirelessly transmitted from the remote control terminal.

* * * * *